(12) United States Patent
Candry et al.

(10) Patent No.: US 9,363,492 B2
(45) Date of Patent: Jun. 7, 2016

(54) PROJECTOR OPTICS

(75) Inventors: Patrick C. Candry, Harelbeke (BE);
Bart H. J. Maximus, Oudenaarde (BE)

(73) Assignee: Barco N.V., Kortrijk (BE)

( * ) Notice: Subject to any disclaimer, the term of this patent is extended or adjusted under 35 U.S.C. 154(b) by 0 days.

(21) Appl. No.: 14/412,027

(22) PCT Filed: Jul. 1, 2012

(86) PCT No.: PCT/EP2012/062788
§ 371 (c)(1),
(2), (4) Date: Dec. 30, 2014

(87) PCT Pub. No.: WO2014/005612
PCT Pub. Date: Jan. 9, 2014

(65) Prior Publication Data
US 2015/0172610 A1    Jun. 18, 2015

(51) Int. Cl.
*G03B 21/20* (2006.01)
*H04N 9/31* (2006.01)
*G03B 21/14* (2006.01)
*G02B 27/48* (2006.01)
*G02B 5/02* (2006.01)
*G02B 27/09* (2006.01)

(52) U.S. Cl.
CPC .............. *H04N 9/3155* (2013.01); *G02B 27/48* (2013.01); *G03B 21/142* (2013.01); *G03B 21/206* (2013.01); *H04N 9/3129* (2013.01); *H04N 9/3152* (2013.01); *H04N 9/3161* (2013.01); *G02B 5/0263* (2013.01); *G02B 27/0927* (2013.01)

(58) Field of Classification Search
CPC .... G03B 21/20; G03B 21/206; G03B 21/208; H04N 9/31; H04N 9/3155; H04N 9/3161; H04N 9/3191; H04N 9/3194; H04N 9/3152
See application file for complete search history.

(56) References Cited

U.S. PATENT DOCUMENTS

| | | |
|---|---|---|
| 6,771,325 B1 | 8/2004 | Dewald et al. |
| 2003/0063264 A1 | 4/2003 | Watanabe et al. |
| 2006/0215285 A1 | 9/2006 | Dewald |
| 2007/0263179 A1 | 11/2007 | Katsuragawa et al. |

(Continued)

OTHER PUBLICATIONS

International Preliminary Report on Patentability dated Jan. 6, 2015 for Corresponding Application No. PCT/EP2012/062788.

(Continued)

*Primary Examiner* — William C Dowling
*Assistant Examiner* — Ryan Howard
(74) *Attorney, Agent, or Firm* — Renner, Otto, Boisselle & Sklar, LLP

(57) ABSTRACT

Projector methods, devices, software are described for a high decrease of the black level without decrease or a limited decrease of the luminance of the bright pixels for use with high contrast and high dynamic range projectors, e.g. based on RGB lasers or phosphor converted lasers. Such projectors can be used in a digital cinema, in a home theatre, in virtual reality systems, in simulators for training, for example. The projector optical system is adapted to vary, according to an average picture level, an effective étendue of the light source and to keep light power confined within a varying cone angle, whereby at the imaging system the projector étendue is matched to the effective étendue of the light source, the effective light source étendue and the projector étendue being controlled to the average picture level.

24 Claims, 21 Drawing Sheets

(56) References Cited

U.S. PATENT DOCUMENTS

2009/0244496 A1* 10/2009 Sugino .................. H04N 9/3155
353/85
2012/0086922 A1* 4/2012 Yamashita .......... G03B 21/2053
353/85

OTHER PUBLICATIONS

International Search Report and Written Opinion dated Apr. 17, 2013 for Corresponding Application No. PCT/EP2012/062788.

* cited by examiner

PROJECTOR OPTICS

This application is a national phase of International application No. PCT/EP2012/062788 filed Jul. 1, 2012 and published in English language.

The present invention relates to projector optics for use in a projector, a method of operating such optics, a controller for controlling such optics and software for execution of any of the methods of the present invention.

TECHNICAL BACKGROUND

Projectors are known that have a light source an optical system a micro-display, whereby the optical system includes a projection lens for projecting an image onto a screen.

Contrast has a strong impact on the perceived quality of images [30], [31], [32]. In a micro-display based projection display multiple factors are determining the contrast of the projected image. In the dark state there is always a small amount of light leakage through the optical system, resulting in a black level with a finite luminance level. This can be caused by various mechanisms and depends on the type of micro-display technology e.g. limited extinction ratio, skew rays, birefringence, light scattering, diffraction etc.

Various prior approaches for reducing the black level have been proposed. In [26] a method to block diffracted light with both an aperture in the illumination ray bundle and the projection lens was proposed. The reduction of efficiency of the projector was minimized by an optimal shape and orientation of the illumination and projector apertures. In [28] an asymmetric aperture stop on the light path between two groups of lenses of the projection lens was proposed to block scattered light without blocking the desired projection light. In [29] an adjustable asymmetrical illumination aperture and an adjustable asymmetrical projection aperture was proposed to increase the grayscale resolution. In [27] a dynamic aperture to modulate the light intensity in the illumination path according a control signal being a function of the image brightness level was proposed.

The prior approaches for reducing the black level all suffer from a loss of luminance of the bright pixels.

SUMMARY OF THE INVENTION

This present invention in some embodiments the advantage that it provides methods, devices, software, i.e. means for a high decrease of the black level without decrease or a limited decrease of the luminance of the bright pixels.

The present invention can be used, for example with High contrast and high dynamic range projectors, e.g. based on RGB lasers or phosphor converted lasers. Such projectors can be used in a digital cinema, in a home theatre, in virtual reality systems, in simulators for training, for example.

Embodiments of the present invention are based on the recognition that a $CR_{on-off}$ of $10^5$ to $10^7$ is required in applications with very low average picture level.

Embodiments of the present invention are based on the recognition that $\epsilon_{Leff}$ and $\epsilon_{Peff}$ can be adapted to the average picture level w. In embodiments $\epsilon_{Leff}$ and $\epsilon_{Peff}$ are kept equal. In order to reduce or avoid geometrical light losses, the effective étendue of the light source and the effective étendue of the projector are kept equal and are set at a value dependent on the average picture content:

$$\epsilon_{Leff}(w) = \epsilon_{Peff}(w) = f(w). \; f(w) \text{ is defined for } w \in [0,1] \text{ and}$$
$$f(1) = \epsilon_{P\,max} = \epsilon_{Leff\,max} \text{ and } f(0) = \epsilon_{P\,min} = \epsilon_{Leff\,min}.$$

Embodiments of the present invention are based on the recognition that although in general the black level can be reduced by using apertures in both the illumination system and the projection lens, there is always a large geometrical light loss and consequently a strong reduction of the full white luminance. Embodiments of the present invention avoid the problem of a resultant substantial but still insufficient increase of the $CR_{on-off}$.

Various embodiments of the present disclosure are directed to methods and apparatus for realizing very high $CR_{on-off}$ and zero or minimal light loss for the full white luminance.

The present invention provides a projector optical system for projecting a picture having an average picture level and for use with a light source having a substantially low intrinsic étendue, comprising an imaging system for making a real image on a screen, and a control unit, wherein the projector optical system is adapted to vary, according to an average picture level, an effective étendue of the light source and to keep light power confined within a varying cone angle, whereby at the imaging system the projector étendue is matched to the effective étendue of the light source, the effective light source étendue and the projector étendue being controlled by the control unit and being adapted to the average picture level.

In embodiments the present invention provides a projector optical system for projecting a picture having an average picture level and for use with a light source having a substantially low intrinsic étendue, the system comprising:

A first illumination system

A means for increasing the light source étendue such as a diffuser element,

A second illumination system that captures the light from the light spot on the means for increasing the light source étendue such as the diffuser element and homogenizes the light, so that the illumination on a spatial light modulator such as a light valve or micro-display is almost equal for all areas and images it on the spatial light modulator such as a light valve or micro-display An imaging system for making a real image of the spatial light modulator such as a light valve or micro-display on a screen A control unit, and A controllable aperture such as an iris controlled by the control unit in the limiting aperture of the imaging system, the controllable aperture being adapted to block stray light from the black state of the spatial light modulator such as a light valve or micro-display, wherein the projector optical system is adapted to vary, according to an average picture level, an effective étendue of the light source and to keep light power confined within a varying cone angle, whereby at the imaging system the projector étendue is matched to the effective étendue of the light source, the effective light source étendue and the projector étendue being controlled by the control unit and being adapted to the average picture level.

The present invention also provides a controller for use with a projector optical system for projecting a picture having an average picture level and for use with a light source having a substantially low intrinsic étendue, the optical system comprising: an imaging system for making a real image on a screen, wherein the controller is adapted to vary, according to an average picture level, an effective étendue of the light source and to keep light power confined within a varying cone angle, whereby at the imaging system the projector étendue is matched to the effective étendue of the light source, the effective light source étendue and the projector étendue being controlled by the control unit and being adapted to the average picture level.

Embodiments of the present invention also provide a controller for use with a projector optical system for projecting a picture having an average picture level and for use with a light source having a substantially low intrinsic étendue, the optical system comprising:

A first illumination system

A means for increasing the light source étendue such as a diffuser element

A second illumination system that captures the light from the light spot on the means for increasing the light source étendue such as the diffuser element and homogenizes the light, so that the illumination on a spatial light modulator such as a light valve or micro-display is almost equal for all areas and images it on the spatial light modulator such as a light valve or micro-display An imaging system for making a real image of the spatial light modulator such as a light valve or micro-display on a screen, and A controllable aperture such as an iris in the limiting aperture of the imaging system, the controllable aperture being adapted to block stray light from the black state of the spatial light modulator such as a light valve or micro-display, wherein the controller is adapted to vary, according to an average picture level, an effective étendue of the light source and to keep light power confined within a varying cone angle, whereby at the imaging system the projector étendue is matched to the effective étendue of the light source, the effective light source étendue and the projector étendue being controlled by the control unit and being adapted to the average picture level.

The present invention also provides a method of operating a projector optical system for projecting a picture having an average picture level and for use with a light source having a substantially low intrinsic étendue, the system comprising an imaging system for making a real image on a screen, and a control unit, the method comprising: varying, according to an average picture level, an effective étendue of the light source and keeping light power confined within a varying cone angle, and matching at the imaging system the projector étendue to the effective étendue of the light source, the effective light source étendue and the projector étendue being adapted to the average picture level.

The present invention also provides a method of operating a projector optical system for projecting a picture having an average picture level and for use with a light source having a substantially low intrinsic étendue, the system comprising:

A first illumination system

A means for increasing the light source étendue such as a diffuser

A second illumination system that captures the light from the light spot on the means for increasing the light source étendue such as the diffuser element, and homogenizes the light, so that the illumination on a spatial light modulator such as a light valve or micro-display is almost equal for all areas and images it on the spatial light modulator such as a light valve or micro-display An imaging system for making a real image of the spatial light modulator such as a light valve or micro-display on a screen A control unit, and A controllable aperture such as an iris controlled by the control unit in the limiting aperture of the imaging system, the controllable aperture being adapted to block stray light from the black state of the spatial light modulator such as a light valve or micro-display, wherein the method comprises the steps of:

varying, according to an average picture level, an effective étendue of the light source and keeping light power confined within a varying cone angle, and matching at the imaging system the projector étendue to the effective étendue of the light source, the effective light source étendue and the projector étendue being adapted to the average picture level.

One embodiment of the present disclosure varies, according to the average picture level, the effective étendue of a light source with a substantially low intrinsic étendue, and consequently the incident cone angle on the spatial light modulator such as a light valve or micro display, but keeps the total light power confined within the varying cone angle. The light source étendue is varied with a diffuser element with varying scattering angle. At the projection lens site the projector étendue is matched to the effective étendue of the light source. Consequently no geometrical light losses occur. The effective light source étendue and the projector étendue are controlled by a control unit and can be adapted to the average picture level.

A second embodiment of the present disclosure varies the size of the incident beam on the diffuser element to achieve the same goals as in the first embodiment. In this embodiment the diffuser element is a regular diffuser or a phosphor type diffuser. The phosphor type diffuser will convert the incident wavelength to light with longer or shorter wavelengths than the wavelength of the incident light. Because in this embodiment the effective light source étendue is varied by varying the size of the incident illumination spot, it is necessary to have an optical system to convert the property of varying laser illumination spot to a maximum illumination cone angle on the spatial light modulator like a light valve or micro display.

The present invention provides a computer program product comprising code segments for execution on a processing engine such as in a computer the computer program product being adapted to operate a projector optical system for projecting a picture having an average picture level and for use with a light source having a substantially low intrinsic étendue, whereby the system can comprise: an imaging system for making a real image on a screen, wherein the software is adapted to:

vary, according to an average picture level, an effective étendue of the light source and to keep light power confined within a varying cone angle, whereby at the imaging system the projector étendue is matched to the effective étendue of the light source, the effective light source étendue and the projector étendue being controlled by the control unit and being adapted to the average picture level.

Embodiments of the present invention also provide a computer program product comprising code segments for execution on a processing engine such as in a computer the computer program product being adapted to operate a projector optical system for projecting a picture having an average picture level and for use with a light source having a substantially low intrinsic étendue, whereby the system can comprise:

A first illumination system

A means for increasing the light source étendue such as a diffuser element

A second illumination system that captures the light from the light spot on the means for increasing the light source étendue such as the diffuser element and homogenizes the light, so that the illumination on a spatial light modulator such as a light valve or micro-display is almost equal for all areas and images it on the spatial light modulator such as a light valve or micro-display An imaging system for making a real image of the spatial light modulator such as a light valve or micro-display on a screen A control unit, and A controllable aperture such as an iris controlled by the control unit in the limiting aperture of the imaging system, the controllable aperture being adapted to block stray light from the black state of the spatial light modulator such as a light valve or micro-display, wherein the software is adapted to control these elements to:

vary, according to an average picture level, an effective étendue of the light source and keeping light power confined within a varying cone angle, and matching at the imaging system the projector étendue to the effective étendue of the light source, the effective light source étendue and the projector étendue being adapted to the average picture level.

Definitions

Average Picture Level

The average picture level of a video signal is defined as the time average of the luminance level expressed as a percentage of the full white signal level [35].

Contrast

A well-known phenomenon of human vision is its enormous dynamic range of approximately 10 decades (from approximately $10^{-5}$ cd/m² to $10^{+5}$ cd/m²), however only approximately 2 decades of luminance variation are simultaneously perceptible.

The dynamic range of luminance is divided into 3 ranges: a range where only the cones are active (photopic vision, from $10^5$ to 1 cd/m²), a range where both the cones and rods are active (mesopic vision, from 1 to $10^{-3}$ cd/m²), and a range where only the rods are active (scotopic vision, from $10^{-3}$ to $10^{-5}$ cd/m²). The temporal, spatial and color perception properties of the human visual system are different in these 3 luminance ranges Adaptation to the level of the ambient light is necessary to adjust the range of sensitivity [33].

The concept of contrast refers to the difference in brightness. Contrast, denoted C, is the ratio $$C = \frac{L_o - L_b}{L_b},$$

with $L_g$ the luminance of the object or stimulus and $L_b$ being the luminance of the background.

The contrast ratio, denoted CR, is the ratio $$CR = \frac{L_o}{L_b}.$$

The modulation depth, denoted M, is the ratio $$M = \frac{L_o - L_b}{L_o + L_b}.$$

Contrast ratio can be measured according to different methods [30], [31] and [32]. ANSI contrast, denoted $CR_{ANSI}$, uses a checkerboard image of 16 equal black and white rectangles. Full on full off contrast ratio, denoted $CR_{on-off}$, is the ratio of the full white luminance $L_{max}$ to the full black luminance $L_{min}$. The $CR_{ANSI}$ has a typical value of 150:1 to 300:1. The $CR_{on-off}$ has a typical value, depending on the micro display technology, between 2000:1 and 10,000:1.

For images with a high average picture level, denoted w and w∈[0,1], the $CR_{ANSI}$ is a good approximation for the contrast. For images with a very low w the $CR_{on-off}$ is a relevant measure for the contrast. In [1] a formula for the relation between the CR, the $CR_{on-off}$ and the $CR_{ANSI}$ was given for a white picture content:

$$\frac{1}{CR} = \frac{1}{CR_{on-off}} + 2w\left(\frac{1}{CR_{ANSI}} - \frac{1}{CR_{on-off}}\right) \text{ for } 0 \leq w \leq 0.5$$

see FIG. 1 which shows CR as a function of the white content for $CR_{ANSI}$=150:1 and $CR_{on-off}$ equal to respectively 1,000:1, 3,000:1, 10,000:1 and 100,000:1.

The forgoing formula is only defined for w∈[0, 0.5]. In practice the average picture level can have values in the range [0,1], and the contrast will, for w>0.5, furthermore decrease lower than $CR_{ANSI}$.

For the adapted eye, in the scotopic vision range, the lowest perceptible luminance level is approximately $10^{-5}$ cd/m². The black level or full black luminance is $L_{min} = L_{max} CR_{on-off}^{-1}$. For a display with a full white luminance of e.g. 100 cd/m² a $CR_{on-off} \approx 10^7$ is required. If we assume that the lowest required dark level corresponds with the cone threshold luminance level of $10^{-3}$ cd/m², then a $CR_{on-off} \approx 10^5$ is necessary for a display with a full white luminance of 100 cd/m² [34]. See FIG. 2 which shows the black level $L_{min}$ as a function of $CR_{on-off}$ for a display with full white luminance of 100 cd/m².

The prior approaches for reducing the black level all suffer from a loss of luminance of the bright pixels.

A well-known property of projectors and light sources is their étendue. This is a pure geometrical quantity and it is a measure for the light gathering power of the imaging optics of a projector and the extent of the ray bundle of a light source.

Projector Étendue $\epsilon_P$

The étendue of the imaging optics of a projector, denoted $\epsilon_P$, is defined as:

$$\varepsilon_P = n^2 \cdot \int_A \int_\Omega dA \cdot \cos\theta \cdot d\Omega = n^2 \int_A dA \cdot \int_{\phi=0}^{2\pi} d\phi \cdot \int_{\theta=0}^{\theta_0} \cos\theta \cdot \sin\theta \cdot d\theta$$

$$= n^2 \cdot A \cdot \pi \cdot \sin^2\theta_0 = A \cdot \pi \cdot (NA)^2 \approx \frac{A \cdot \pi}{4 \cdot (F_{no})^2}$$

where A is the surface of the micro display, n the refractive index of the object space, $2\theta_0$ is the angular aperture of the projection lens, NA=n sin $\theta_0$ the numerical aperture of the projection lens and $F_{no}$ is the f-number of the projection lens [7] pp. 271-281. See FIG. 3 which shows a micro-display with flat surface A and projection lens with angular aperture $2\theta_0$, N is the normal to the surface A.

FIG. 4 shows schematically an entrance and exit pupil. The entrance pupil is the image of the physical aperture stop (i.e. the limiting aperture) as seen from the axial point $P_0$. The angle $2\theta_0$ which the diameter of the entrance pupil subtends at $P_0$ is the angular aperture—see [6] pp. 186-188.

EXAMPLE

A micro display with surface of 241.9 mm² (diagonal 0.94 inch and aspect ratio b:h=16:9, b being the width and h being the height) in combination with a projection lens with a 24° angular aperture has an étendue of 30 mm²sr. The étendue of typical projection displays is between approximately 11 and 50 mm²sr.

Effective Projector Étendue $\epsilon_{P\ eff}$

When an adjustable aperture is positioned in the limiting aperture of the projection lens, then the numerical aperture of the projection lens and the étendue can be reduced and is called here the effective projector étendue, denoted $\epsilon_{P\ eff}$. At the maximum diameter of the limiting aperture the projector étendue is $\epsilon_{P\ max}$. When the aperture is completely closed then the projector étendue is zero: $0 < \epsilon_{P\ eff} < \epsilon_{P\ max}$ Light Source Étendue $\epsilon_{P\ eff}$ The light source étendue is denoted $\epsilon_{P\ eff}$. When the light source has a flat surface $A_L$ and the radiation of the light is in a cone with half angle $\phi$ then:

$\epsilon_L = n^2 \cdot \pi \cdot \sin^2\phi \cdot A_L$

When the radiation of the light is in an elliptical shaped cone with half angles $\phi$ and $\phi^*$ then:

$\epsilon_L = n^2 \cdot \pi \cdot \sin\phi \cdot \sin\phi^* \cdot A_L$

Intrinsic Light Source Étendue $\epsilon_{Lint}$

The intrinsic étendue of a light source, denoted as $\epsilon_{Lint}$, as the smallest étendue possible of the light source that contains (almost) all the light power of the light source. This intrinsic étendue depends on the surface of the emitter and the angular radiation characteristics of the emitter. Any practical optical component will increase the étendue of the combination of the light source and this optical component.

Short Arc UHP Lamp and Reflector

The light collected by an projection system with étendue $\epsilon_{P\ eff}$ from a state of the art short arc UHP lamp (specific type of high intensity discharge lamp) with the center of the arc in the focal point of a parabolic or an elliptical reflector is in reference [3] given by:

$$\Phi = 32 P \text{atan}\left(\frac{\varepsilon_{Peff}}{3.8\ d^2 + 0.9\ d + 0.8}\right)$$

where $\Phi$ is the collected light flux (lm), P the lamp power (W), d the arc length (mm) and $\epsilon_{P\ eff}$ the effective étendue of the projector (mm² sr).

For a given value of the arc length is $\Phi$ a strictly increasing function of $\epsilon_{P\ eff}$ with asymptote $$32P\frac{\pi}{2}.$$

The fraction of the light gathered by the imaging optics of the projector is $$\frac{2}{\pi}\text{atan}\left(\frac{\varepsilon_{Peff}}{3.8\ d^2 + 0.9\ d + 0.8}\right).$$

FIG. 5 shows the fraction of the light gathered by the imaging optics of a projector with étendue $\epsilon_{Peff}$ (in mm²sr) from a short arc lamp with an arc length of 1 mm in a reflector.

For an UHP lamp with an arc length of 1 mm, an étendue of 69.5 mm²sr is required for a light gathering of 95% of the total light flux, 90% is reached for an étendue of 34.5 mm²sr.

High Brightness LED

The light radiating surface of state of the art high brightness LED's is a planar rectangular surface with angular radiation pattern that is almost Lambertian. Examples are the Osram red LE A P3W, green LE T P3W and blue LE B P3W high brightness LEDs and the Luminus Devices PT120 type high brightness LEDs.

Example: the Osram red LE A P3W, green LE T P3W and blue LE B P3W high brightness LEDs have each a radiating surface of 11.75 mm². The fraction of the collected light flux as a function of the full cone angle $2\phi$ is given in the graph shown in FIG. 6. This shows the fraction of the light flux from LE X P3W high brightness LEDs gathered in solid angle with full cone angle $2\phi$.

For a half cone angle $\phi=70°$ almost 95% of the light flux is collected, the corresponding étendue is $\epsilon_{Lint}=32.6$ mm²sr.

This matches approximately with the projector étendue of a micro display with surface of 241.9 mm² (diagonal 0.94" and aspect ratio b:h=16:9, b being the width and h being the height) in combination with a projection lens with a 24° (angular aperture. In this case a decrease of the projector étendue or an increase of the effective light source will result in geometrical light losses.

RGB Lasers

RGB lasers for projection displays are under development. In references [14], [15], [17], [18] and [19] the properties of these light sources for projection displays are discussed. For these light sources $\epsilon_{Lint} \ll \epsilon_{P\ max}$.

Example: the blue ($\lambda=447$ nm) laser diode Nichia NDB7352 has typical divergence half angles $\phi//=6°$ and $\phi\perp=20°$ both a $1/e^2 \approx 0.1353$. The estimated intrinsic étendue is 0.6 µm² sr.

Calculation of $\epsilon_{L\ int}$ of this Laser Diode:

If it is assumed that the radiating surface has a rectangular shape with height $D_x$ and width $D_y$, then the Fraunhofer diffraction pattern at a distance d in the far field is:

$$I(x, y) = I_0 \cdot \text{sinc}^2\left(\frac{D_x x}{\lambda d}\right) \cdot \text{sinc}^2\left(\frac{D_y y}{\lambda d}\right)$$

with: $\text{sinc}(x) = \frac{\sin(\pi x)}{\pi x}$

See reference [2] pp. 128-131.

Then the relative intensity with a value of $1/e^2$ on the x and y axis corresponds with the arguments:

$$\frac{D_x x}{\lambda d} = 0.7004 \text{ and } \frac{D_y y}{\lambda d} = 0.7004$$

and $\frac{x}{d} = \tan(6°) = 0.1051$ and $\frac{y}{d} = \tan(20°) = 0.3640$

Therefore $D_x=6.664\lambda=2.979$ µm and $D_y=1.924\lambda=0.860$ µm The radiating surface is: $D_x \cdot D_y = 2.562$ µm².

If it is assumed that all the power is contained within and elliptical cone with half angles (the half angles are corresponding with the first zeros of the diffracted intensity pattern):

$\varphi_x = \frac{\lambda}{D_x} = 0.1501$ rad $= 8.598°$ and $\varphi_y = \frac{\lambda}{D_y} = 0.5198$ rad $= 29.78°$ The étendue is:

$$\epsilon_{L\ int} = n^2 \pi D_x D_y \sin\phi_x \sin\phi_y$$

And for a refractive index n=1 is: $\epsilon_{L\ int} = 0.597\ \mu m^2$ sr.

The intrinsic étendue of a laser light source is thus much smaller than the étendue of LEDs and high intensity discharge lamps; the $\epsilon_{L\ int}$ is also much smaller than $\epsilon_{P\ max}$.

Phosphor Conversion

The technology to convert blue light or near ultraviolet light from InGaN LEDs to longer wavelength light by means of exciting one or more conversion phosphors is well known for the state of the art white light LEDs and phosphor converted green light LEDs. A widely applied phosphor for yellow emission is e.g. $Y_3Al_5O_{12}$ (yttrium aluminum garnet) as the host material doped with the optical active element $Ce^{3+}$ references [8], [9] pp. 179-190 and [10]. FIG. 7 shows a phosphor-converted LED [see reference 11].

For projection displays a phosphor conversion scheme using blue light from InGaN laser diodes was proposed and applied in [12] and [13]. Blue laser diodes have high wall plug efficiencies and some phosphors have high conversion efficiencies, a light source with a spatial compact emitting area with high efficiency can therefore be realized. FIG. 8 shows a phosphor layer illuminated for example by a collimated blue laser beam, the phosphor layer is applied on a reflecting substrate One important aspect is the thermal behavior of the conversion phosphor. Typically for conversion phosphors is the drop of the quantum efficiency and total emission power at elevated temperatures, this is called thermal quenching. This is caused by several non-radiative decay mechanisms at these elevated temperatures [8]. This means it is very important to have a good heat evacuation and the temperature control of the phosphor layer. FIG. 9 shows thermal quenching, and temperature dependence of the integral emission intensity.

The étendue of a phosphor converted blue laser light source depends on the illuminated area on the phosphor layer.

Effective Light Source Étendue $\epsilon_{L\ eff}$

All the light emitted from the light source can be geometrically collected by the optical system of the micro display and the projection lens if: $\epsilon_{L\ eff} \leq \epsilon_{P\ eff}$. Some light sources have an $\epsilon_{Lint} \ll \epsilon_{L\ eff} \leq \epsilon_{P\ max}$. In these cases the effective endue of the light source can be increased from $\epsilon_{Lint}$ to $\epsilon_{P\ eff}$ without geometrical losses. Increasing the light source étendue beyond $\epsilon_{P\ eff}$ will result in geometrical light losses because a part of the emitted light will not be collected by the micro display aperture and the projection lens. FIG. 10 shows the effective light source and projector étendue, there being no geometrical losses in the shaded area.

In accordance with embodiments of the present invention the intrinsic light source étendue can be increased by a means for increasing the light source étendue such as an optical element e.g. a diffuser. Assume that a collimated laser beam, with circular cross section and diameter $d_0$ is incident on a diffuser sheet. The diffuser has a scattering half cone angle $\phi_1$ and the light emitting area of the diffuser, seen from position A, becomes a circle with diameter $d_1$. Due to the scattering of the diffuser sheet is $d_1 > d_0$. The diffuser sheet can be a bulk diffuser or a surface diffuser. A state of the art diffuser is i.e. a frosted glass diffuser from Sigma Koki, Japan. FIG. 11 shows the increase of the intrinsic étendue with a diffuser in an illumination system.

After the diffuser the étendue is increased to a value $$\frac{d_1^2 \pi^2}{4} \sin^2\varphi_1.$$

It is also possible to decrease the intrinsic étendue of a light source with by means for decreasing the light source étendue e.g. by an aperture. In this case geometrical losses will reduce the transport of optical power because a part of the light rays will be blocked by the aperture.

An adjustable aperture such as an iris at a suitable position in the light path of an illumination system will act as means for decreasing the light source étendue as it will reduce the solid angle emerging from the light source and consequently reduce the effective light source étendue. FIG. 12 shows the decrease of the intrinsic étendue with adjustable aperture in an illumination system.

The étendue of the light source is in this example reduced from $\pi A_L \sin^2\phi_1$ to $\pi A_L \sin^2\phi_2$, for unit refractive index of the medium.

The effective étendue of the light source, denoted $\epsilon_{L\ eff}$, is defined here as the étendue seen form the receiving micro display after the increase or decrease of the intrinsic light source étendue by an optical element.

Increasing the light source étendue beyond the effective projector étendue is not meaningful because light will be lost due to geometrical losses. The minimum value of the effective light source étendue is the intrinsic light source étendue.

$$\epsilon_{Lint} \leq \epsilon_{L\ eff} \leq \epsilon_{P\ eff}$$

Decreasing the light source étendue to a value lower than the intrinsic light source étendue will always result in geometrical light losses, and therefore reduce the power transport from the light source to the imaging optics.

Contrast Ratio Increase of Projectors with $\epsilon_{Lint} \approx \epsilon_{Pmax}$ Consider the practical situation where relative large étendue light sources such as short arc lamps or LEDs are used. As already explained, increasing the light source étendue is in this situation meaningless. On the other hand decreasing the effective light source étendue in combination with decreasing the effective projector étendue is increasing the contrast ratio.

By decreasing the $\epsilon_{L\ eff}$ and $\epsilon_{P\ eff}$ the light output in the on-state (white level) will decrease but the light output in the off-state (dark level) will decrease much more. Consequently the $CR_{on-off}$ will increase. FIG. 1 illustrates that $CR_{on-off}$ is increasing for decreasing $\epsilon_{L\ eff} = \epsilon_{P\ eff}$.

Experimentally it was shown that the $CR_{on-off}$ of a (single chip micro-display) DMD based projector increased from 2000:1 to >15,000:1 using two adjustable apertures, one in the illumination system (adjustable aperture 1) and one in the projection lens (adjustable aperture 2). The aperture diameter changed from 40 mm to 8.47 mm in the illumination system and the aperture diameter in the projection lens changed from 20.8 mm to 6.44 mm.

The drawback of this method is that the total light output of the projector is strongly reduced. In the experiment the ratio of the on-state light output with the 8.47 mm and 6.44 mm apertures to the on-state light output with the apertures of 40 mm and 20.8 mm was only 5%. This is obvious because a large portion of the light is blocked by the apertures.

Speckle Noise

Speckle noise is a phenomenon encountered in amongst others projection displays using light sources with a high degree of spatial and temporal coherence. It is an undesirable random noise pattern that must be minimized. The amount of speckle noise is defined as the ratio of the mean value of the measured noise pattern to the standard deviation of the measured noise pattern, called speckle contrast and here denoted $CR_S$.

The speckle contrast is dependent on various parameters of (1) the projection display, (2) the projection screen and (3) the human visual system of the observers and (4) the position with respect to the screen of the observers. The speckle contrast can be reduced by the addition of uncorrelated, statistical independent speckle noise patterns. In reference [4] the various methods to reduce speckle noise are discussed in detail. The methods for speckle noise reduction are based on spatial averaging or temporal averaging by the detector. In the case of displays the detector is usually the human visual system.

The spatial resolution of the HVS depends on the diameter of the eye's pupil, at low light levels the pupil diameter is increasing and aberrations are reducing the visual spatial resolution [24]. The temporal resolution is also decreasing at lower light levels, the Ferry-Porter Law states that the frequency at which flicker just becomes noticeable varies as the logarithm of the luminance [25]. This means that the integration time of the HVS is increasing at lower light levels. The integration time of the eye is increasing from around 10 to 15 ms in the photopic luminance range to around 100 ms in the scotopic range. Consequently, at lower light levels, the averaging over a larger number of statistical independent speckle patterns will result in a lower speckle contrast.

The projection display and the screen have also a strong influence on the speckle contrast. Increasing the effective projection lens exit pupil diameter will reduce the spatial coherence area on the screen and consequently reduce the speckle noise, references [4] and [5]. Other speckle reduction methods are based on temporal averaging realized by moving diffusers, references [20], [21] and [22]. For each of the methods based on temporal coherence the speckle contrast is decreasing with increasing integration time.

DETAILED DESCRIPTION OF THE PREFERRED EMBODIMENTS

Figure 1:
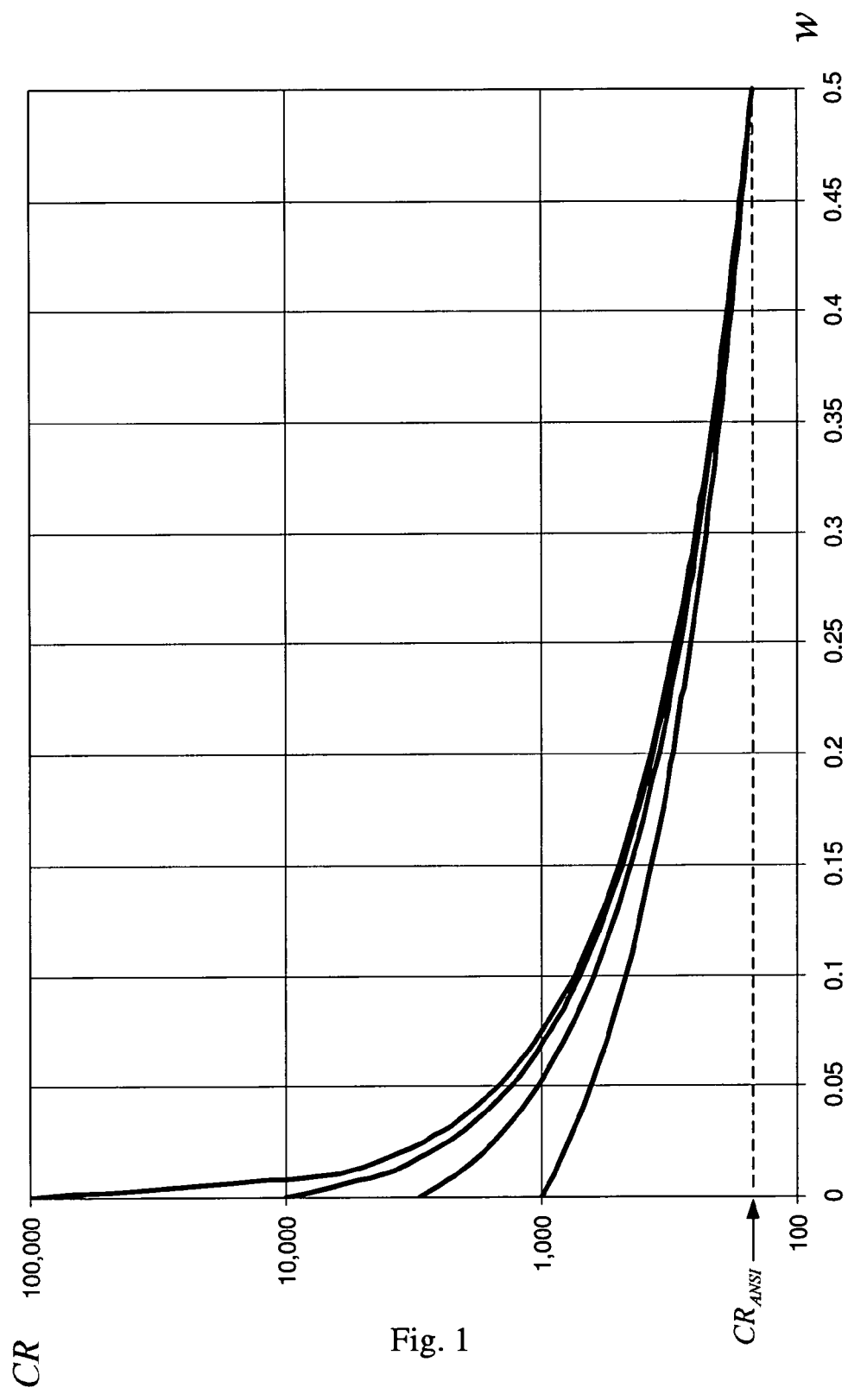
FIG. 1 which shows CR as a function of the white content for $CR_{ANSI}=150:1$ and $CR_{on-off}$ equal to respectively 1,000:1, 3,000:1, 10,000:1 and 100,000:1
Figure 2:
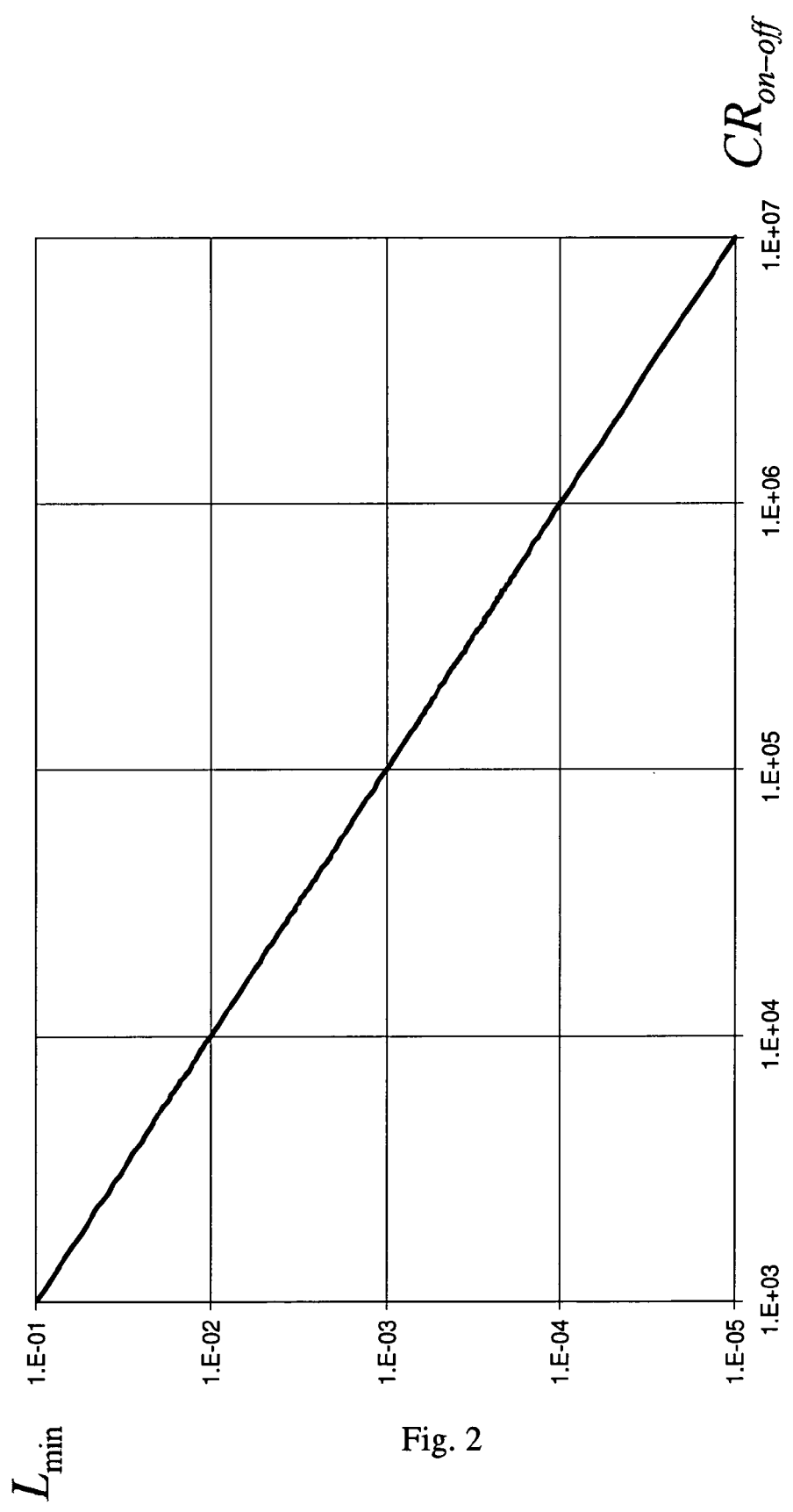
FIG. 2 which shows the black level $L_{min}$ as a function of $CR_{on-off}$ for a display with full white luminance of 100 cd/m².
Figure 3:
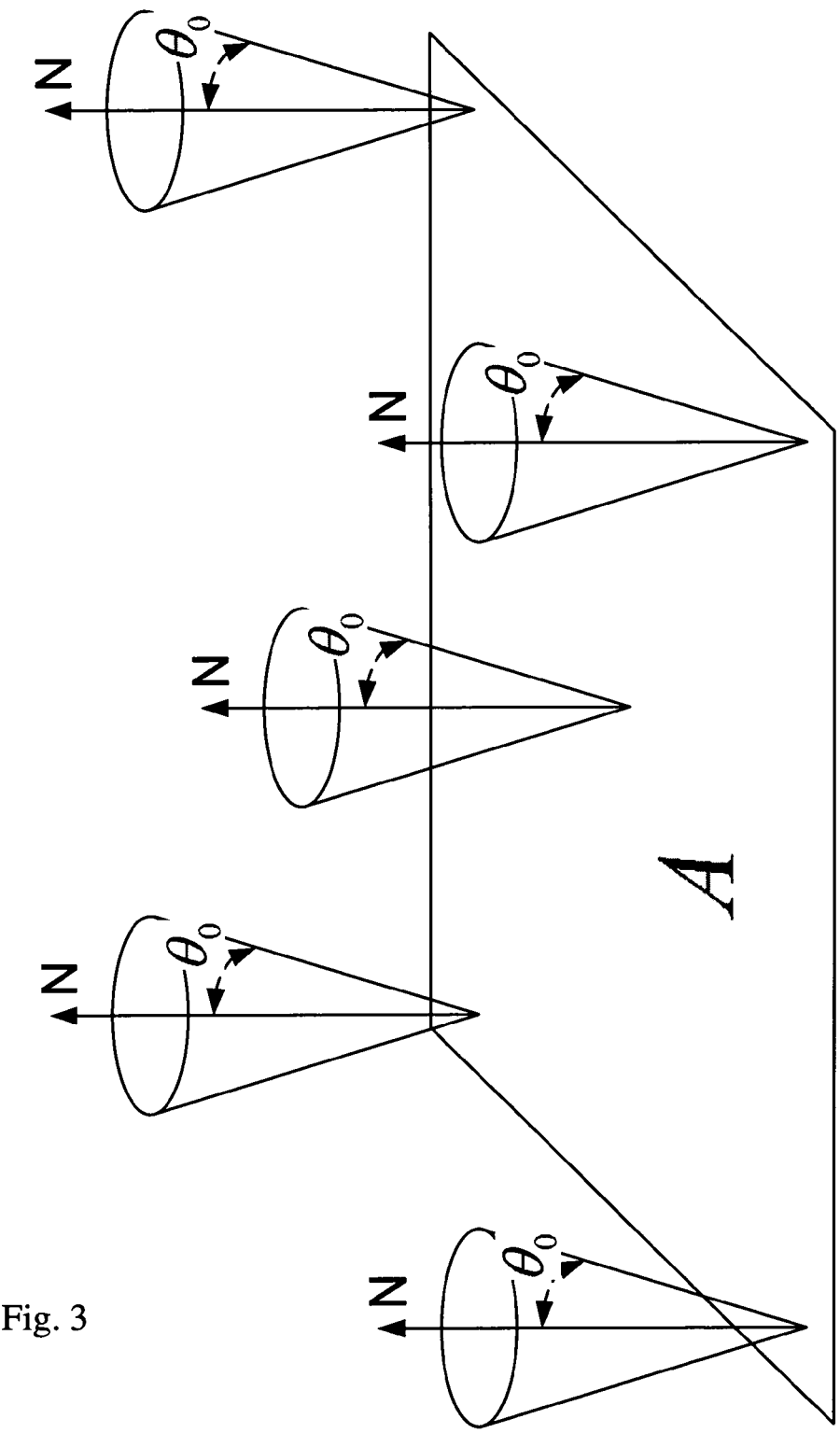
FIG. 3 shows a spatial light modulator in particular a micro display with flat surface A and projection lens with angular aperture $2\theta_0$, N is the normal to the surface A.
Figure 4:
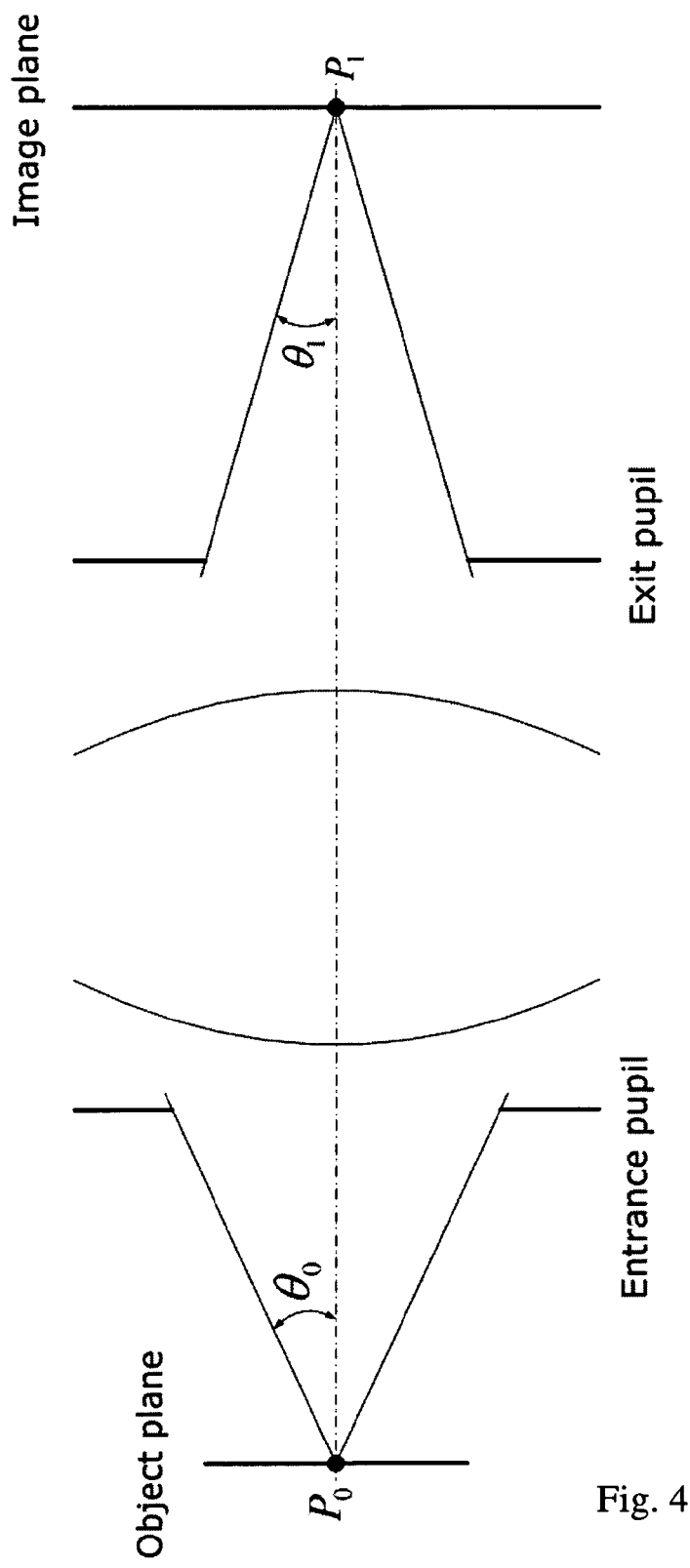
FIG. 4 shows an entrance and exit pupil.
Figure 5:
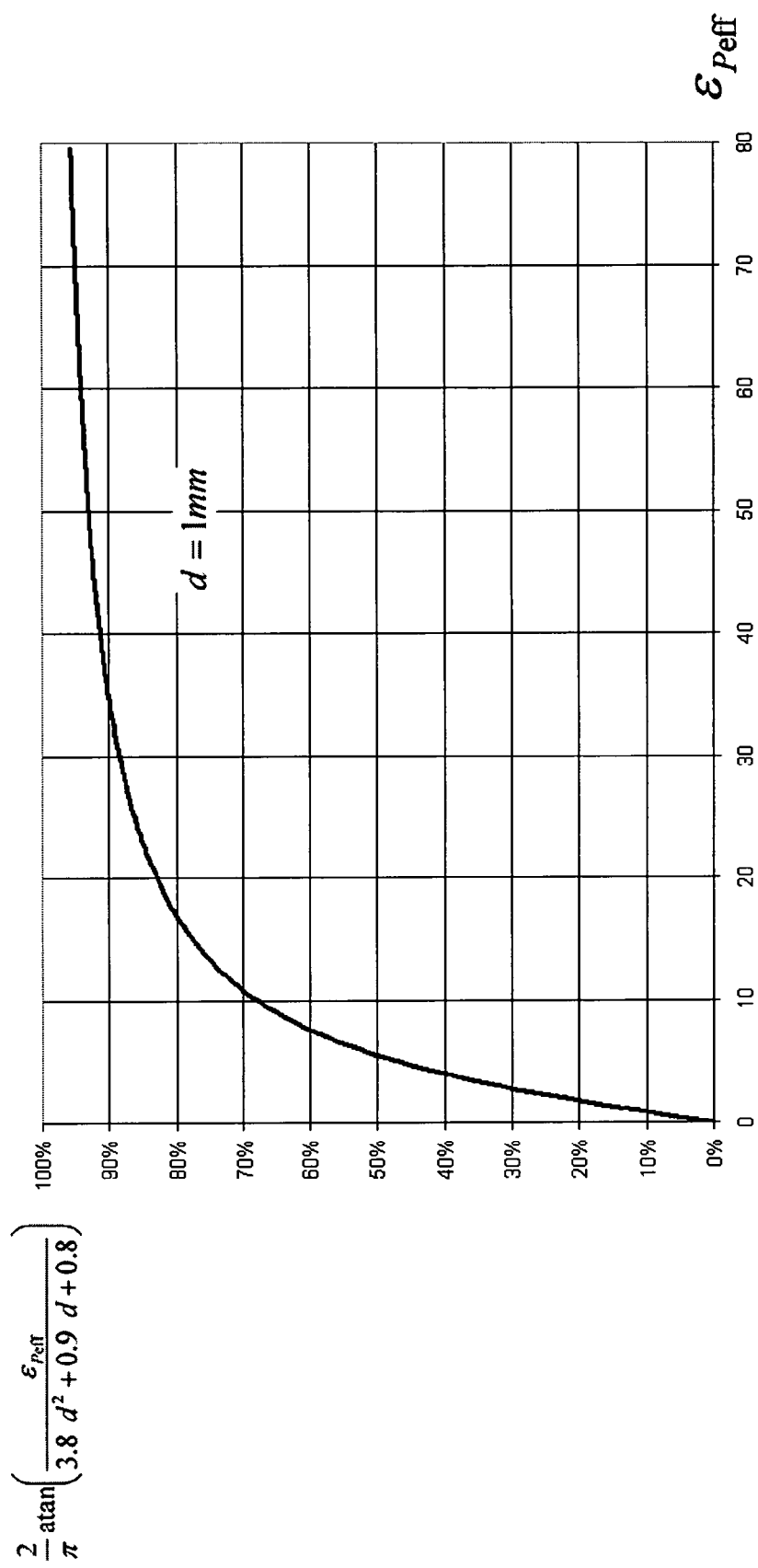
FIG. 5 shows the fraction of the light gathered by the imaging optics of a projector with étendue $\epsilon_{Peff}$ (in mm²sr) from a short arc lamp with an arc length of 1 mm in a reflector.
Figure 6:
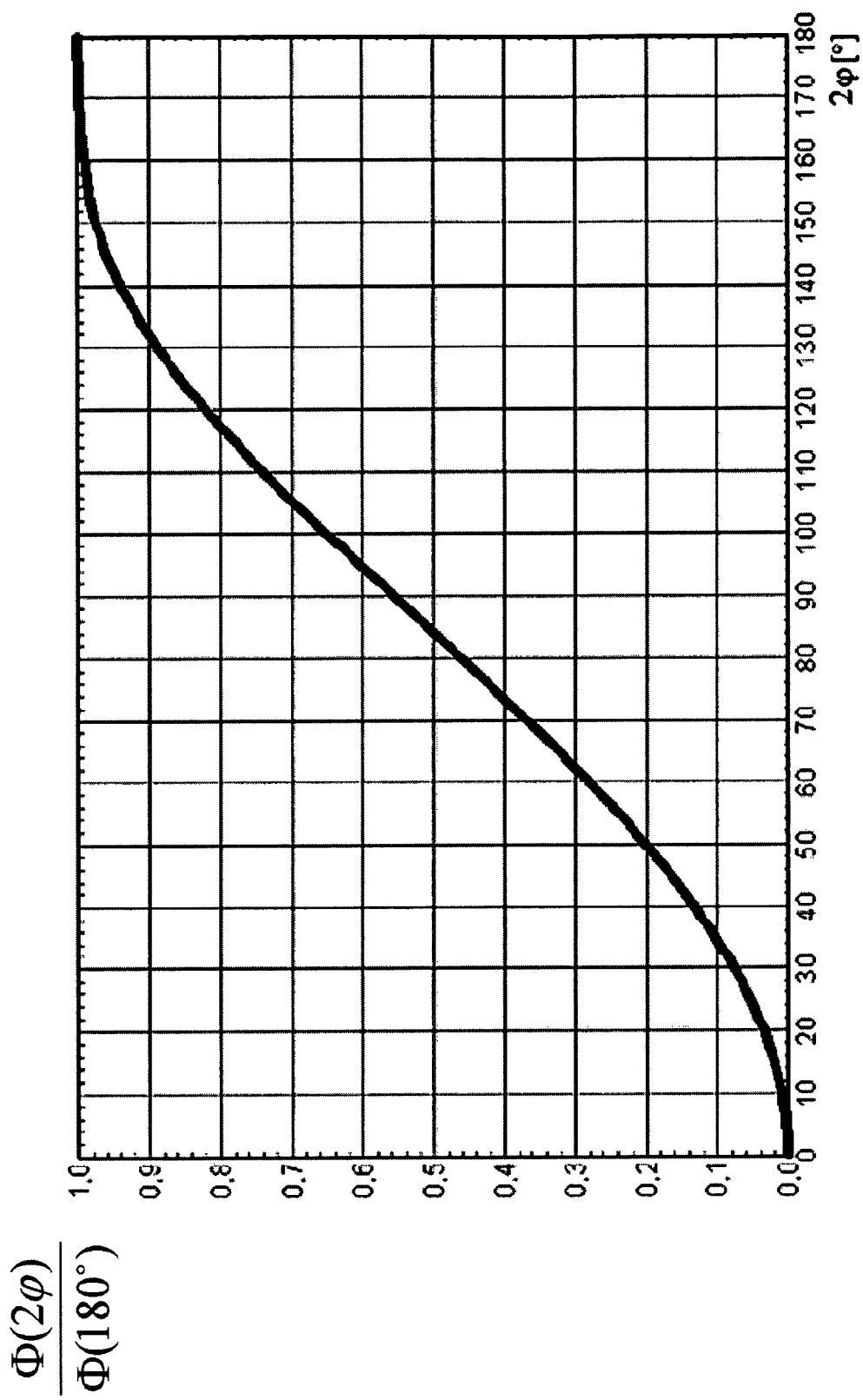
FIG. 6 shows the fraction of the light flux from LE X P3W high brightness LEDs gathered in solid angle with full cone angle $2\phi$.
Figure 7:
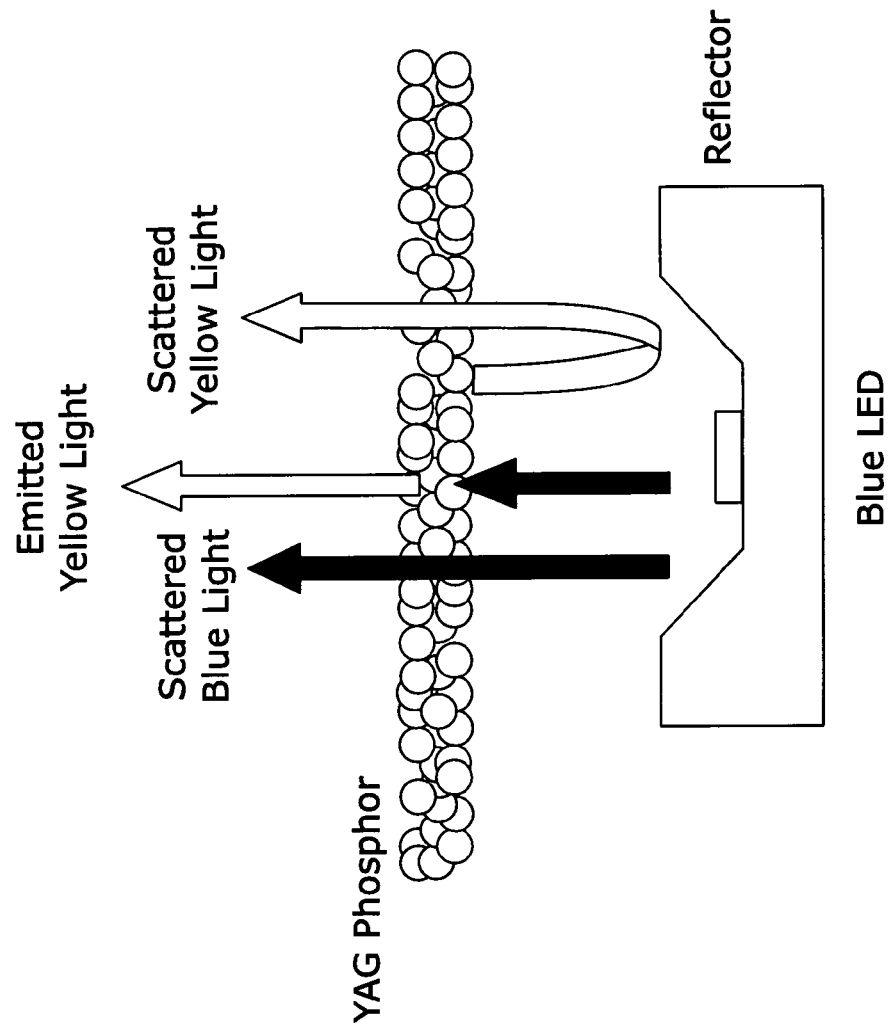
FIG. 7 shows a phosphor-converted LED [see reference 11].
Figure 8:
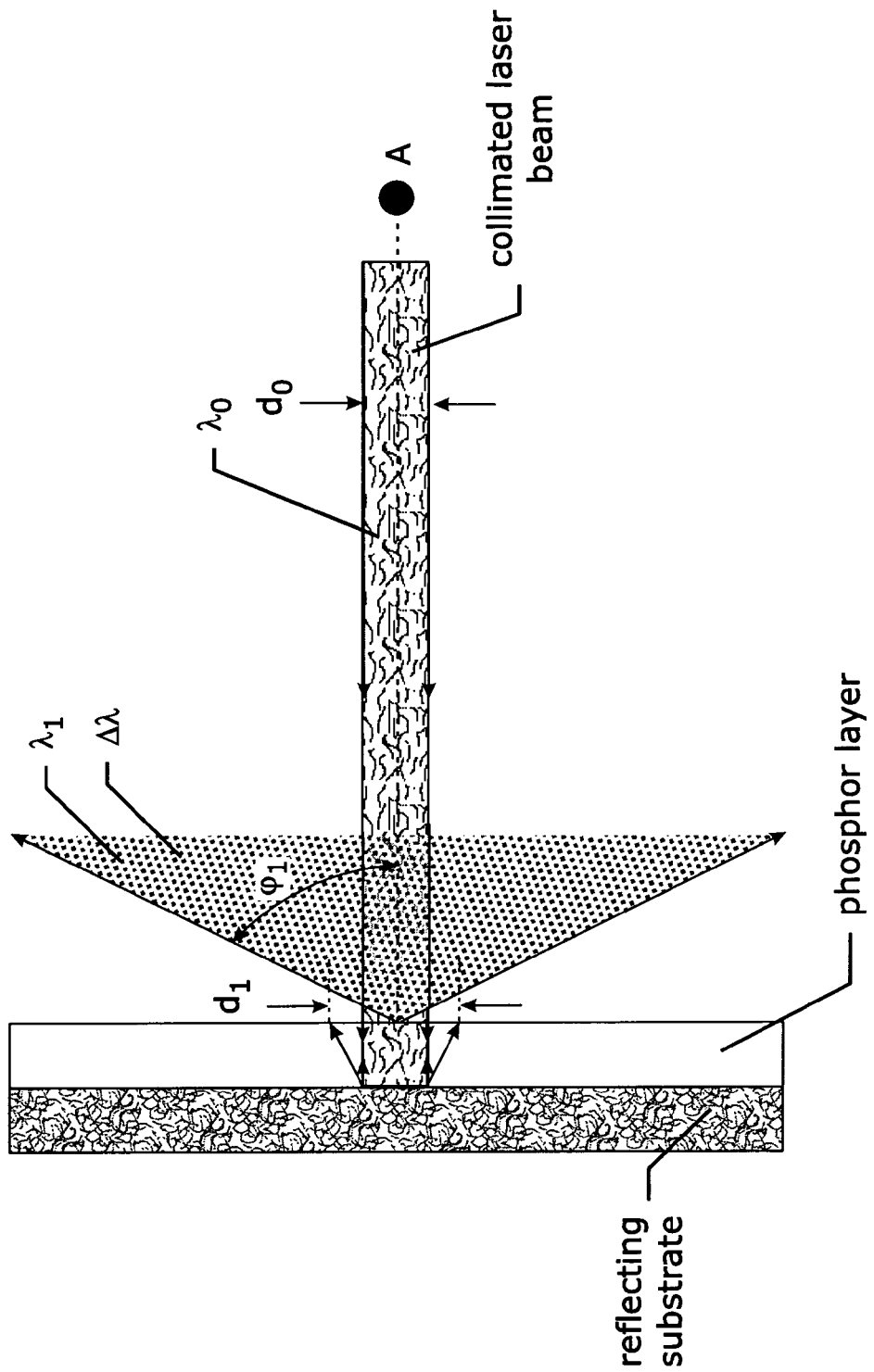
FIG. 8 shows a phosphor layer illuminated for example by a collimated blue laser beam, the phosphor layer is applied on a reflecting substrate.
Figure 9:
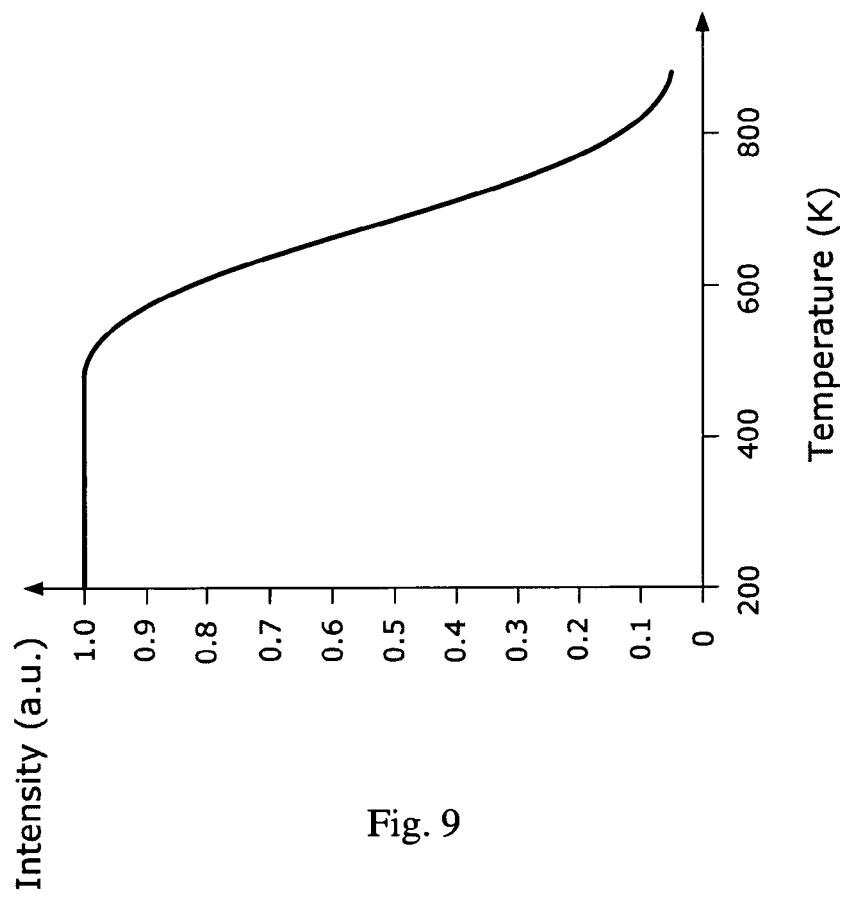
FIG. 9 shows thermal quenching, temperature dependence of the integral emission intensity.
Figure 10:
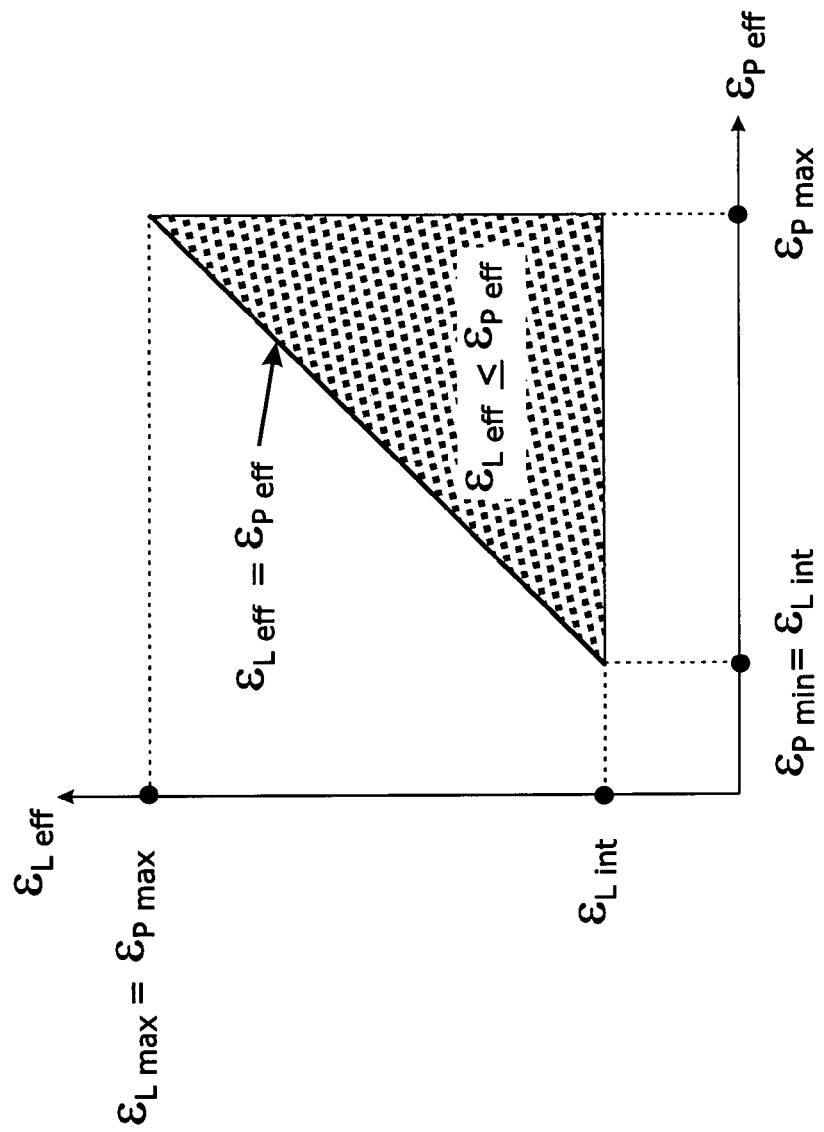
FIG. 10 shows the effective light source and projector étendue, there being no geometrical losses in the shaded area.
Figure 11:
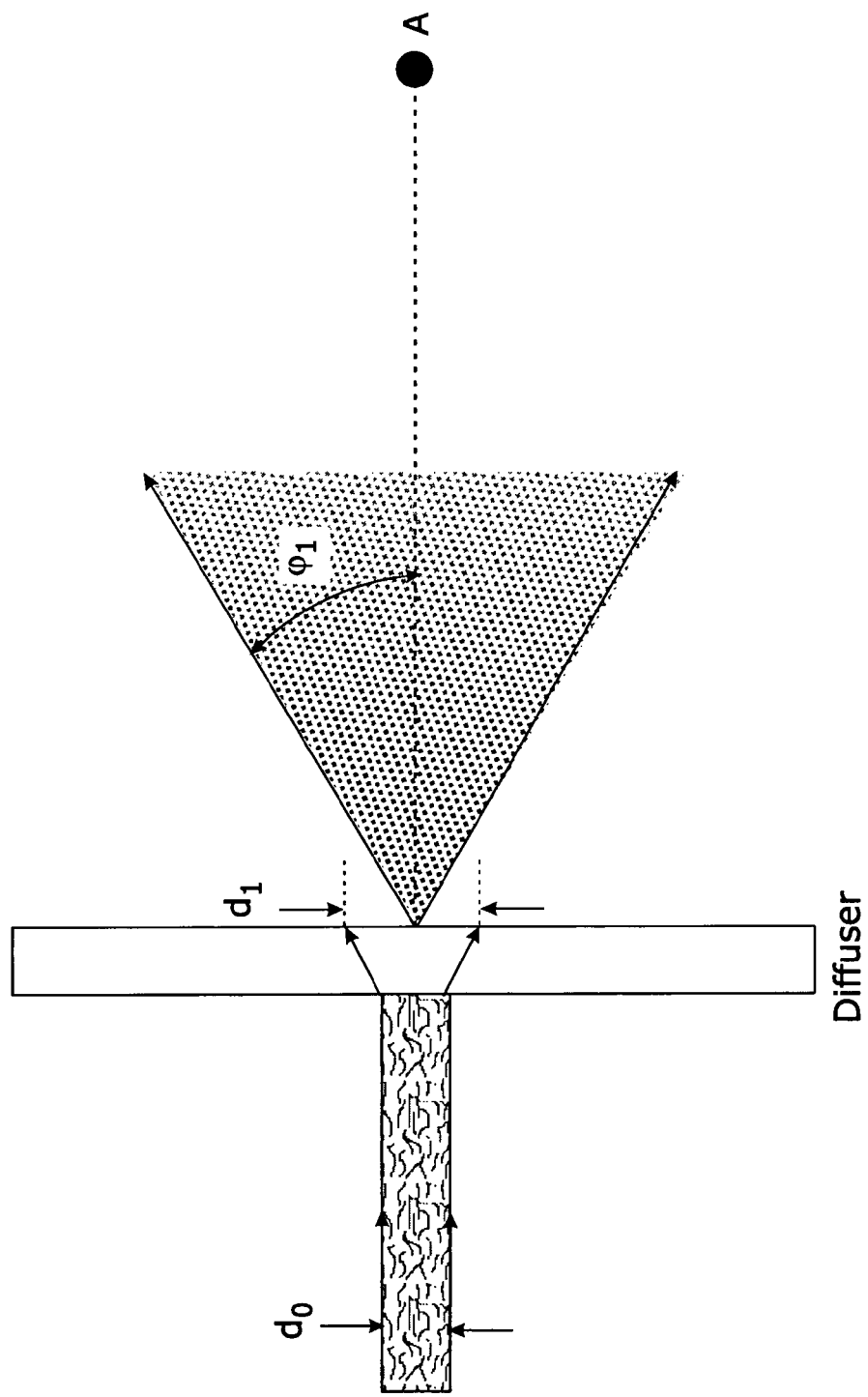
FIG. 11 shows the increase of the intrinsic étendue with diffuser in an illumination system.
Figure 12:
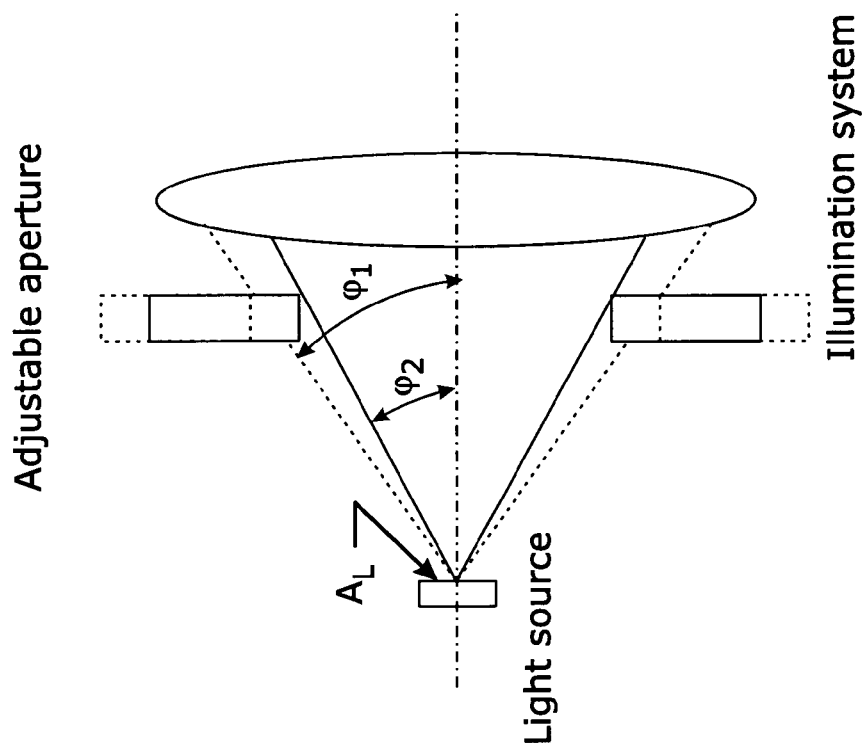
FIG. 12 shows the decrease of the intrinsic étendue with adjustable aperture in an illumination system.
Figure 13:
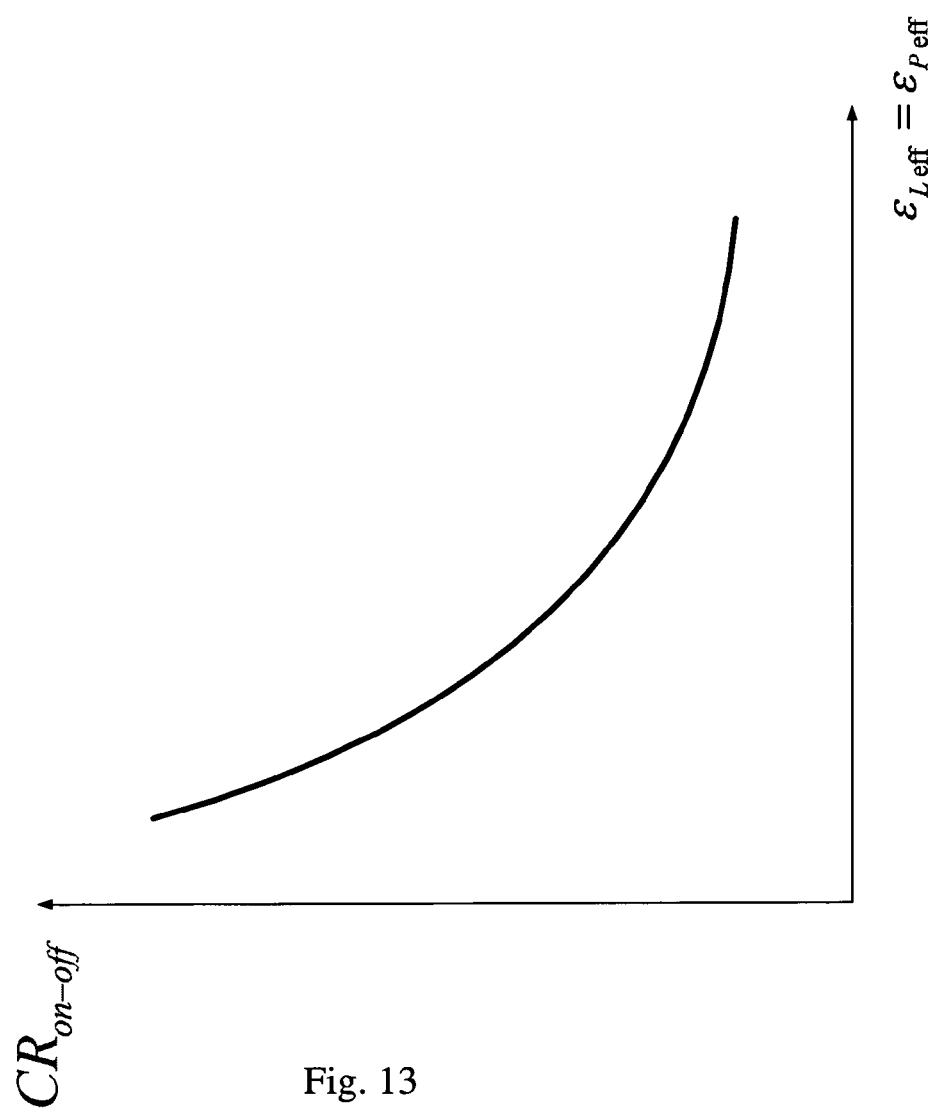
FIG. 13 illustrates that $CR_{on-off}$ is increasing for decreasing $\epsilon_{L\,eff} = \epsilon_{P\,eff}$.

Below, embodiments will be referred to in detail, examples of which are illustrated in the drawings.

The present invention is not limited to the described embodiments, but is limited only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated. The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is moreover to be understood that, in case parameter ranges are given which are delimited by numeric values, the ranges are deemed to include these limitation values, unless stated otherwise.

In the drawings, like reference numerals indicate like features; and a reference numeral appearing in more than one figure refers to the same element.

Various embodiments of high contrast ratio projectors are described below including RGB lasers and phosphor converted light sources although the present invention is not limited thereto.

Figure 17:
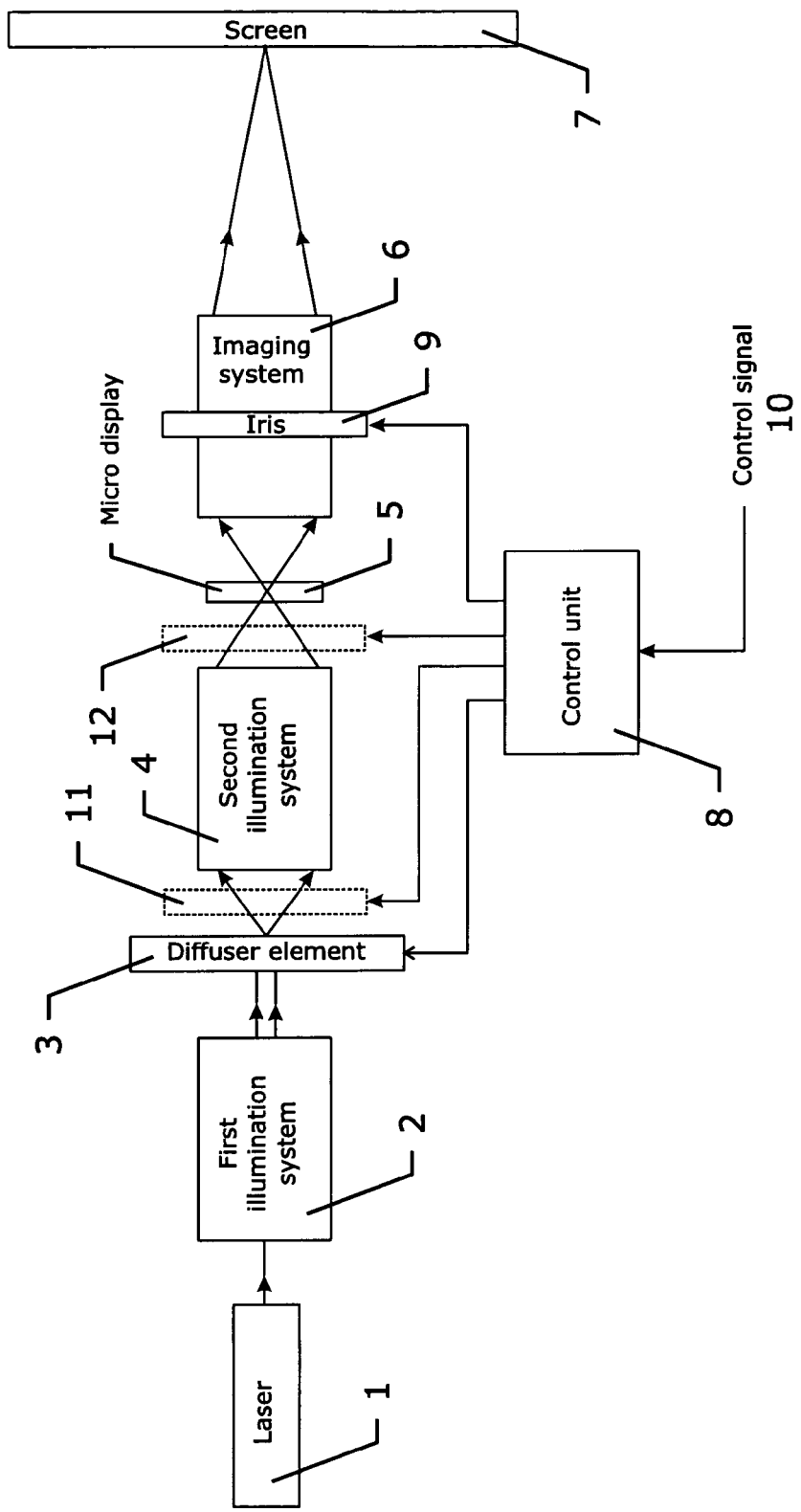
FIG. 17 shows a first embodiment of an optical system according to the present invention.

First Embodiment (See FIG. 17)

A projector optics system according to an embodiment of the present invention comprises the following:

A light source such as a laser (1) with a substantially low étendue, as an example 0.6 μm²sr. The light source can be controlled by a control unit 8, e.g. the optical power output of the light source, e.g. laser.

A first illumination system (2) that brings the light from the light source, e.g. laser on an illuminated location of a diffuser element (3). The light source beam size, e.g. laser beam has a diameter $d_0$ at the incident position on to a means for increasing the light source étendue such as on to a diffuser element. The diffuser element can be controlled by a control unit 8.

The diffuser element can be static or moving (e.g. rotating). For the moving type the distribution of the incident power of the laser beam is spread over a larger area and therefore a lower temperature of the diffuser will be realized. A moving diffuser will also reduce the speckle noise. The speed of rotation of the diffuser element can be controlled by a control unit 8.

The diffuser element can be of the transmissive type or the reflective type. In the first case the diffusive layer is attached or deposited on a transmissive substrate, e.g. a glass plate. In the second case the diffusive layer is attached or deposited on a reflective substrate, e.g. polished aluminum.

For the diffuser element of the moving type on a reflective substrate, the heat can be evacuated by heat sinks on the back side of the substrate.

For the diffuser element of the static type on a reflective substrate, the heat can be evacuated by heat sinks on the back side of the substrate and optional heat pipes.

The diffuser element is characterized by a scattering half cone angle $\phi_1$ and a light spot at the exit side of the diffuser element with a diameter $d_1$. The étendue of the light emitted by the diffuser element is increased to a value $$\frac{d_1^2 \pi^2}{4} \sin^2 \varphi_1.$$

Figure 14:
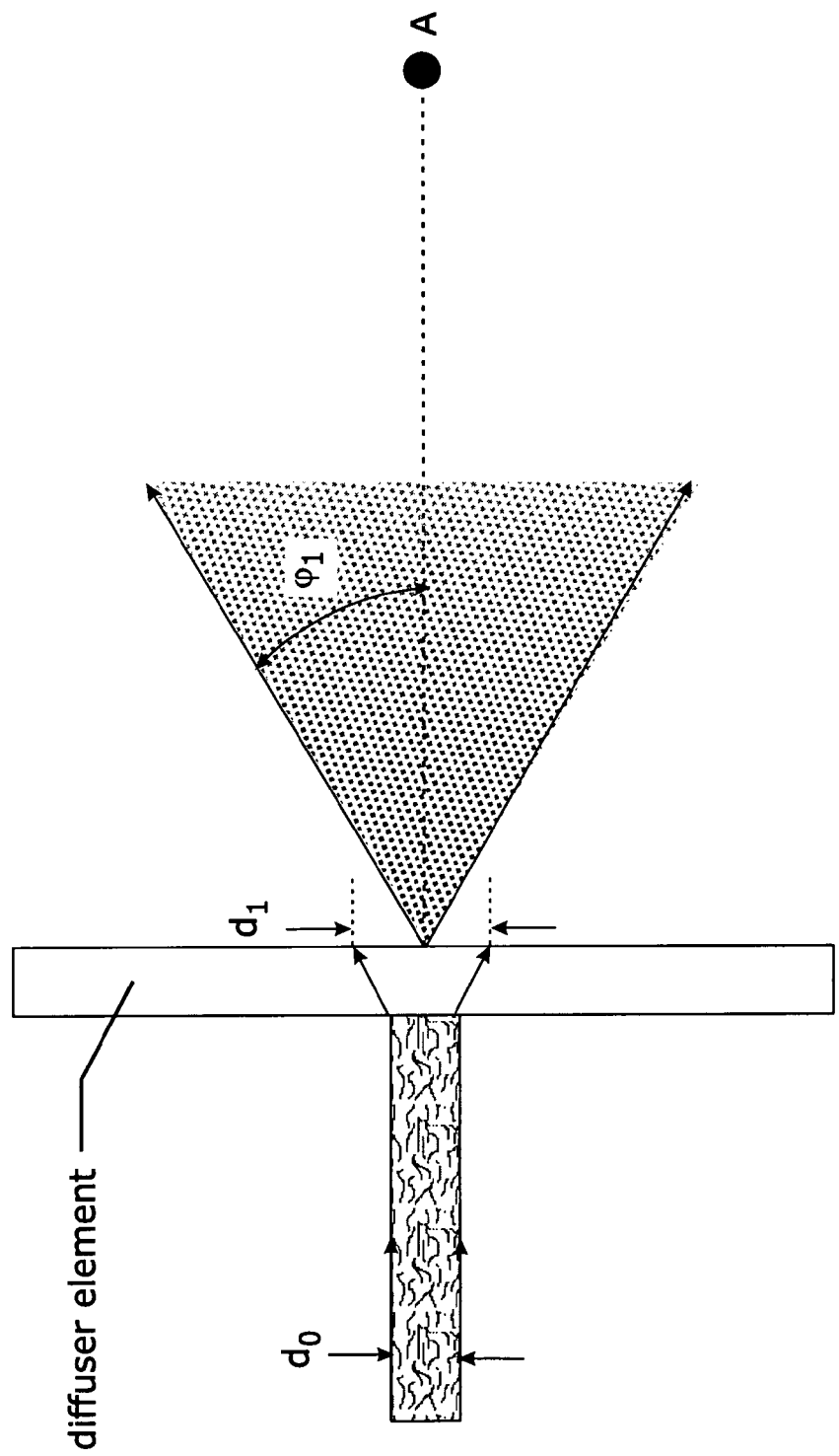
FIG. 14 shows a diffuser element with scattering half cone angle $\phi_1$ and light scattering spot $d_1$.

The diffuser element can e.g. be a bulk diffuser, a surface diffuser or a diffuser based on holographic optical elements (see FIG. 14).

The first illumination system can include a beam expander, in order to lower the power density of the incident light on the diffuser.

The first illumination system can include a beam shaper element, in order to create a top-hat illumination density function on the diffuser.

Figure 15:
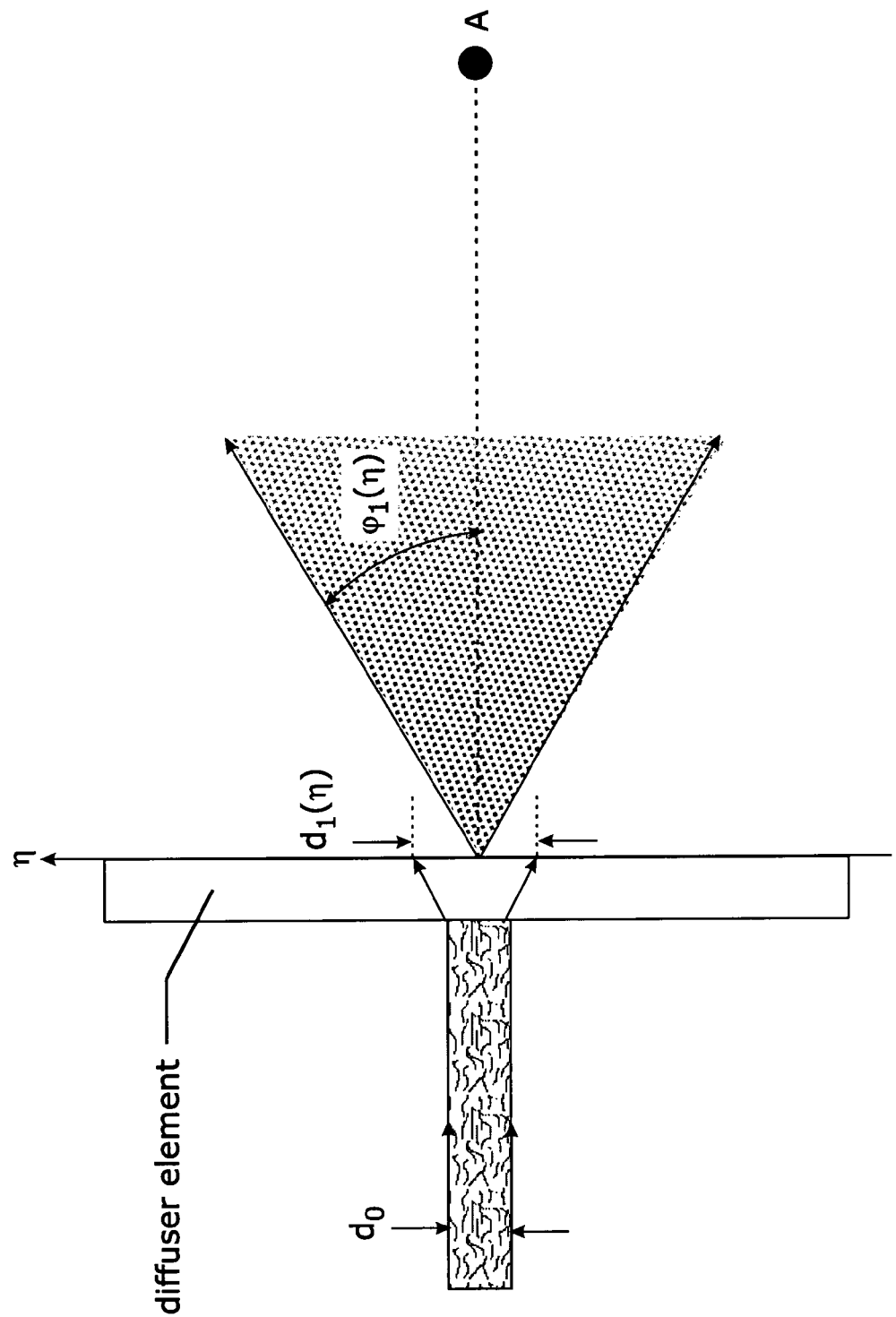
FIG. 15 shows a diffuser element with scattering half cone angle $\phi_1(\eta)$ and light scattering spot $d_1(\eta)$ dependent on the position $\eta$ on the diffuser.

The diffuser element (3) can have a varying strength, for instance with a different scattering half cone angle depending on the location on the diffuser of the light spot. The location of the light spot on the diffuser element can be controlled by a control unit 8. In case of a rotating diffuser, the varying strength property can vary according to the direction perpendicular to this rotation. The radial location of the light spot on the rotating diffuser element can be controlled by a control unit 8. This functionality could be realized with e.g. a diffuser based on holographic optical elements. FIG. 15 shows a diffuser element with scattering half cone angle $\phi_1(\eta)$ and light scattering spot $d_1(\eta)$ dependent on the position $\eta$ on the diffuser.

A second illumination system (4) with the following functions:
- a) It captures the light from the light spot on the diffuser and images it on a spatial light modulator such as a light valve or the micro display (5) such as a micro-mirror device (MMD).
- b) It maintains the property of a varying maximum scattering angle from the diffuser location also as a varying maximum illumination cone angle on the spatial light modulator such as the light valve or micro-display, i.e. if the maximum diffusive angle at the diffuser is low, then the maximum illumination cone angle on the spatial light modulator e.g. light valve or micro-display is also low, and if the maximum diffusive angle at the diffuser is high, the maximum illumination cone angle on the spatial light modulator e.g. light valve or micro display is also high.
- c) It homogenizes the light preferably, so that the illumination on the spatial light modulator such as a light valve or micro-display is almost equal for all areas, for all diffusive angles.

An example of an element that can perform these functions is a light pipe with a long enough length so that there are enough reflections in the light pipe for a good homogenization even in the case of the smallest maximum diffusive angle.

A spatial light modulator e.g. light valve or micro display (5) of the reflective or the transmissive type, e.g. DMD or DLP, LCD high temperature polysilicon or LCoS.

An imaging system (6) that makes a real image of the spatial light modulator e.g. light valve or micro display on the screen (7). The screen can be a front projection screen or a rear projection screen, for example or simply a wall. This imaging system could be a single projection lens, or a combination of projection lenses.

An adjustable and preferably controllable aperture such as an iris (9) is in the limiting aperture of the imaging system. The controllable aperture of the iris is contributing, e.g. significantly to the main contrast improvement by blocking the stray light from the black state of the micro display. The aperture of the controllable aperture such as the iris can be controlled by a control unit 8.

Aperture (11) and aperture (12) are optional controllable apertures, the diameter of the light transmitting part of these apertures being adjusted with a control signal from a control unit (8) according to the scattering half cone angle of the diffuser. These apertures will block the light rays in unwanted directions caused by scattering in the diffuser element (3) or the second illumination system (4). One of the apertures (11) or (12) can be an integral part of the second illumination system, for example.

A control unit (8) which controls the location on the diffuser element on which the laser light beam is falling, and which controls the iris in the imaging system between the spatial light modulator such as a light valve or micro-display and the projection screen and which controls the optional apertures (11) and (12). This control unit has an input control signal (10).

The input control signal can be generated directly from an image generator as is the case for simulators where a so called time-of-day signal is indicating the necessary black level and luminance level.

The control signal can also be generated by a system that calculates the average picture level w. In this case the necessary black level and luminance level is automatically adapted at the average picture level.

Note that the above has been described for one color channel operation. In the normal case of 3 color channels, any of the embodiments of the present invention when adapted for colour can have a shared diffuser (combination of the colour channels and then re-splitting) or alternatively one diffuser per color, and then split the light afterwards. Any of the embodiments of the present invention may make use of a single channel with time multiplexing of the three colors or more colours.

This first embodiment has an advantage that it allows to increase the contrast ratio considerably for situations where the average picture level w is very small. This is done preferably by using means for increasing the light source étendue such as a diffuser element (3) with a small scattering cone angle, and simultaneously a controllable aperture such as an iris (9) with a corresponding small opening. In this situation both $\epsilon_{L\,eff}$ and $\epsilon_{P\,eff}$ are small and equal. Because of the small intrinsic étendue of the laser light source almost all the light power of the incident light on the diffuser is confined in the small scattering cone angle of the means for increasing the light source étendue such as the diffuser and transported through the complete optical system, i.e. there is no or a reduced amount of geometrical light losses. In practice there will always be small amount of light loss because the diffuser element will scatter small amounts of light in directions with an angle larger than the scattering cone angle. These light rays will be blocked by optional apertures (11) and (12). Due to the small opening of iris (9), the speckle contrast might increase. However in the situation of very low average picture level, the integration time of the HVS (Human Visual System) will be large and the spatial resolution of the HVS will be low. These two effects will again reduce the perceived speckle noise.

When the average picture content increases, then the speckle noise will become more visible. But at increased average picture content it is allowed to increase the black level because the visibility threshold level of the eye also dynamic range of the adapted HVS is limited to about two decades. Therefore in accordance with embodiments of the present invention the controller will react because a larger scattering cone angle of the diffuser element (3) will allow a larger corresponding opening of the iris (9). Of course the optional apertures (11) and (12) should be adjusted accordingly. The increase of the opening of the iris (9) will reduce again the speckle noise.

The system and especially the controller are adapted so that $\epsilon_{Leff}$ and $\epsilon_{Peff}$ can be adapted to the average picture level w. In order to avoid geometrical light losses, the effective étendue of the light source and the effective étendue of the projector are kept equal and are set at a value dependent on the average picture content:

$\epsilon_{Leff}(w)=\epsilon_{Peff}(w)=f(w)\cdot f(w)$ is defined for $w\in[0,1]$ and $f(1)=\epsilon_{P\,max}=\epsilon_{Leff\,max}$ and $f(0)=\epsilon_{P\,min}=\epsilon_{Leff\,min}$.

It is assumed that all parameters influencing the speckle contrast (1) $f(w)$, (2) temporal resolution of the HVS and (3) spatial resolution of the HVS. It is also assumed that $CR_S$ ($f(w)$) is a monotone decreasing or strictly decreasing function of $f(w)$.

The absolute maximum acceptable speckle contrast $CR_{S\,max}$ is also defined, the absolute maximum level of acceptable speckle contrast is thus defining the minimum value $\epsilon_{P\,min}$ of $f(w)$.

It is also assumed that on-off contrast ratio $CR_{on\text{-}off}$ is a monotone decreasing or strictly decreasing function of $f(w)$.

Figure 16:
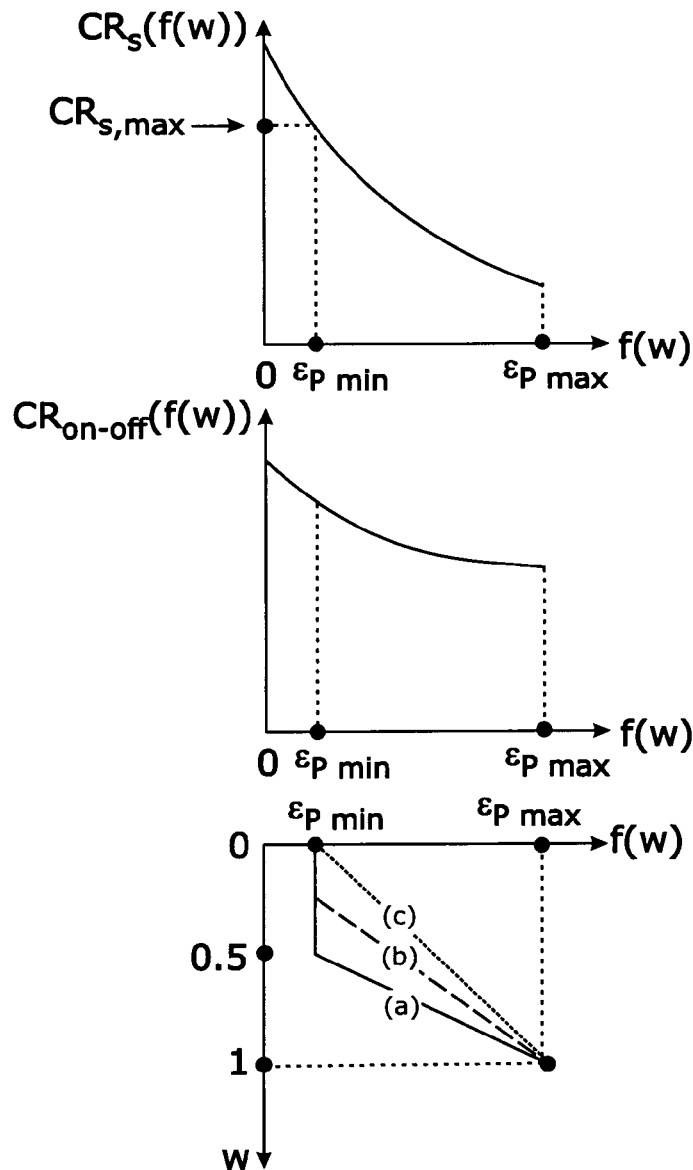
FIG. 16 illustrates speckle contrast, on-off contrast and $f(w)$.

The functions $CR_{on\text{-}off}$ ($f(w)$), $CR_S(f(w))$ and $f(w)$ are depicted in FIG. 16.

For the function $f(w)$ there are many possibilities any of which may be selected appropriately for use with embodiments of the present invention.

The function $f(w)$ can be chosen for highest contrast ratio in the interval $w\in[0,0.5]$ but at a higher speckle noise in this area, function (a) in FIG. 16. FIG. 16 shows speckle contrast, on-off contrast and $f(w)$. Another possibility is to have a linear increasing function (c), this has the advantage that the increase of speckle noise is more gradual. Another possibility is function (b) where the contrast increase and speckle noise increase is more a compromise.

In practice $f(w)$ can be defined experimentally, and stored in a look-up table.

Figure 21:
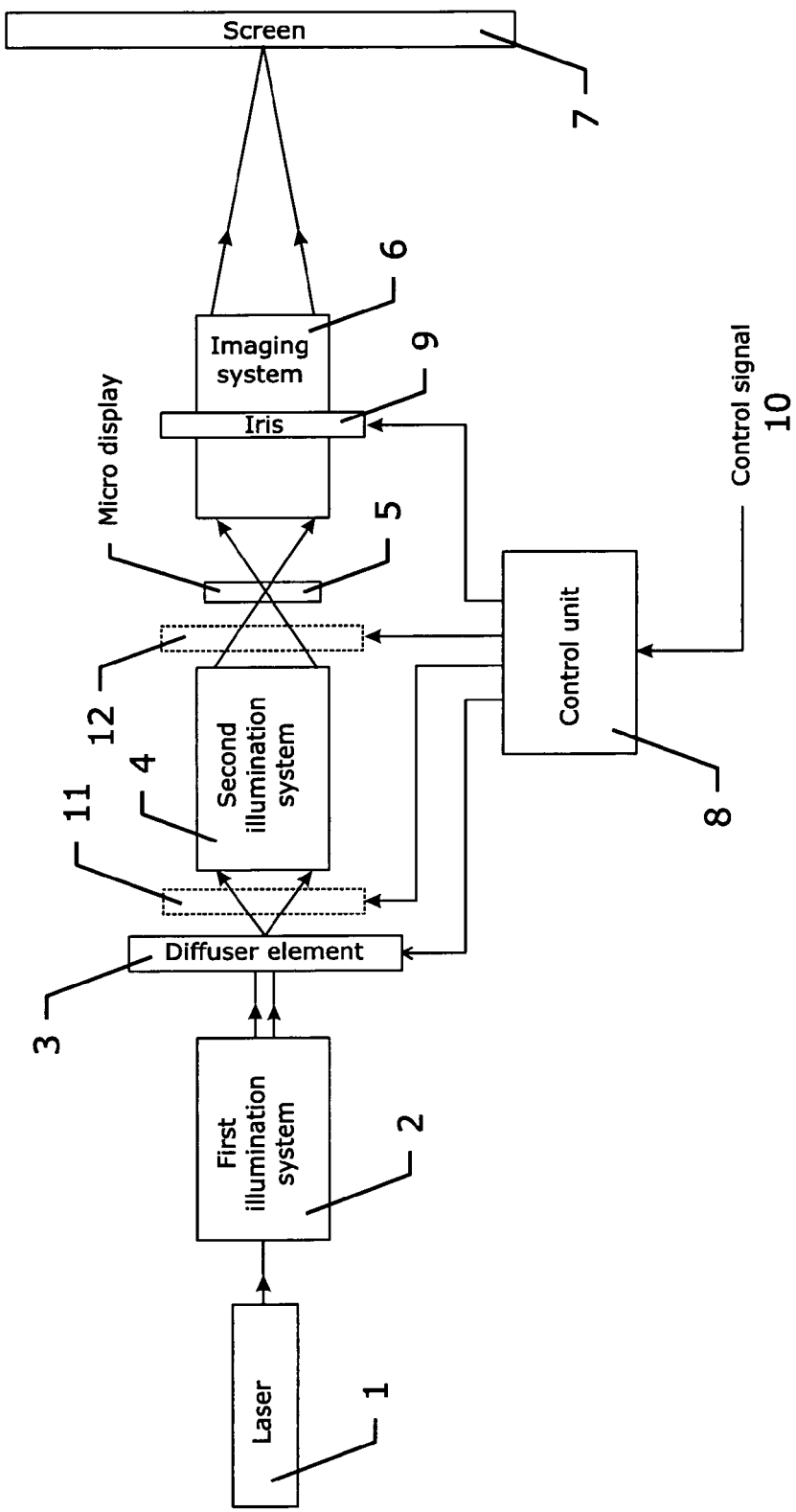
FIG. 21 shows a second embodiment of an optical system according to the present invention.

Second Embodiment (See FIG. 21)

A light source such as a laser (1) with a substantially low étendue, as an example 0.6 µm²sr. The light source can be controlled by a control unit 8, e.g. the optical power output of the light source, e.g. laser.

A first illumination system (2) that brings the light from the light source such as the laser onto an illuminated location of a diffuser element (3). The light beam, e.g. laser beam has a diameter $d_0^*$ at the incident position on a means for increasing the étendue of the light source such as a diffuser element. The first illumination system can be controlled by a control unit 8.

The diffuser element can be static or moving (e.g. rotating). For the moving type the distribution of the incident power of the light beam, e.g. laser beam is spread over a larger area and therefore a lower temperature of the diffuser will be realized. A moving diffuser will also reduce the speckle noise. The location of the light spot on the diffuser element can be controlled by a control unit 8.

For the diffuser element of the moving type on a reflective substrate, the heat can be evacuated by heat sinks on the back side of the substrate.

For the diffuser element of the static type on a reflective substrate, the heat can be evacuated by heat sinks on the back side of the substrate and optional heat pipes.

The diffuser element can be of the transmissive type or the reflective type. In the first case the diffusive layer is attached or deposited on a transmissive substrate, e.g. a glass plate. In the second case the diffusive layer is attached or deposited on a reflective substrate, e.g. polished aluminum.

The diffuser element can be a bulk diffuser, a surface diffuser or a diffuser based on holographic optical elements.

The diffuser element is characterized by a scattering half cone angle ql, varying illumination spot diameter $d_0^*$ and the light spot at the exit side of the diffuser element has a diameter $d_1^*$. The étendue of the light emitted by the diffuser element is $$\frac{d_1^{*2}\pi^2}{4}\sin^2\varphi_1$$

Figure 18:
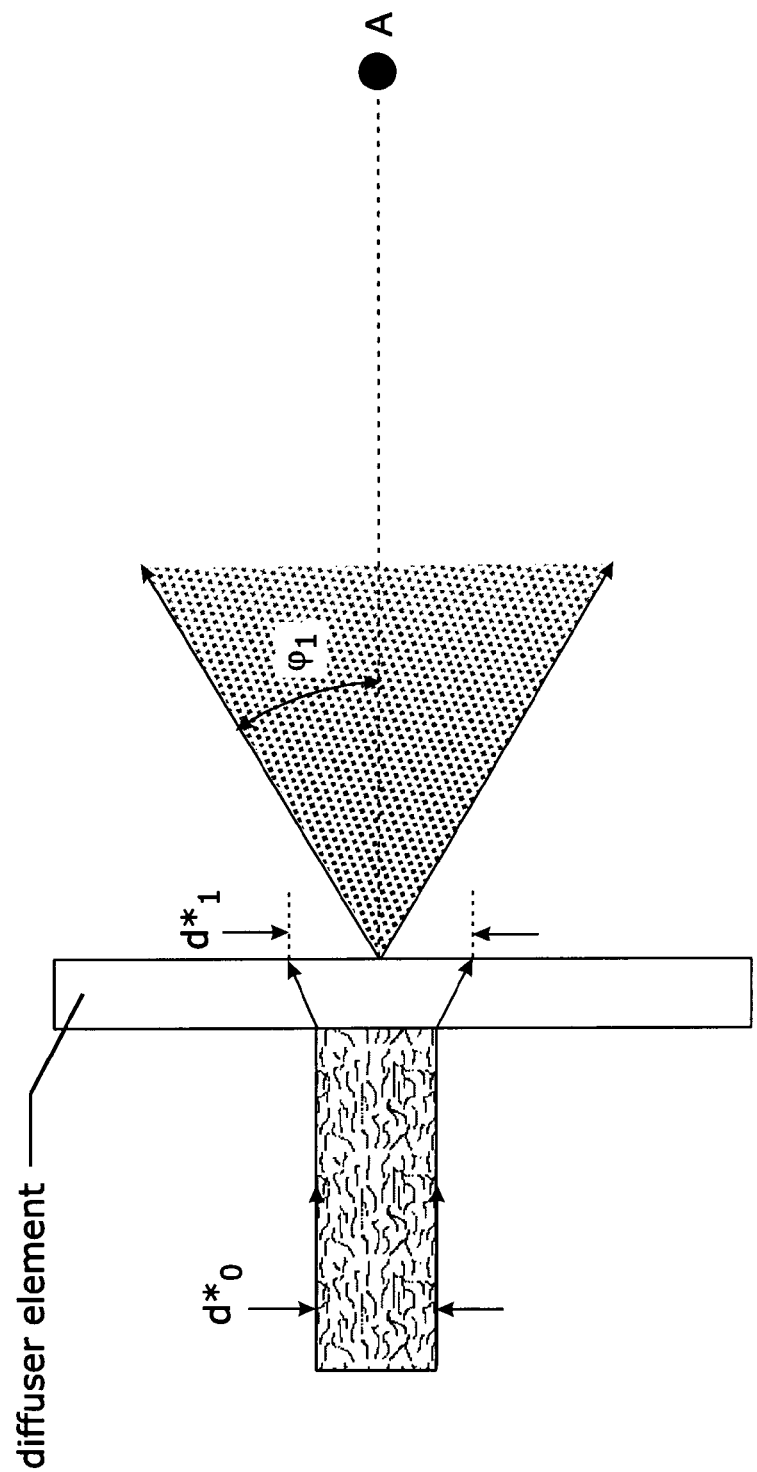
FIG. 18 shows a diffuser element with scattering half cone angle $\phi_1$, varying illumination spot diameter $d_0^*$ and varying emitting spot diameter $d_1^*$.

(see FIG. 18).

The first illumination system can include a beam shaper element in order to create a top-hat illumination density function on the diffuser element.

The first illumination system includes a varying beam expander, which can vary the size of the incident illumination spot on the diffuser. The illumination spot can have a circular shape and is then characterized by a diameter $d_0^*$ and will result in a varying light emitting spot with diameter $d_1^*$ at the exit side of the diffuser element. The varying beam diameter will then result in a varying étendue $$\varepsilon_L = \frac{d_1^{*2}\pi^2}{4}\sin^2\varphi_1.$$

The size of the illumination spot can be controlled by a control unit 8.

A means for increasing the light source étendue such as a diffuser element (3), which can be a regular diffuser which preserves the same wavelength as at the input, or a phosphor type of diffuser element, where there is not only a diffusion of light inside of a certain maximum diffusive angle, but also a conversion of the wavelength of the laser light to an outgoing spectrum of longer wavelengths (down-conversion phosphor) or shorter wavelengths (up-conversion phosphor).

The phosphor type diffuser element can be a transmissive type, i.e. the phosphor material and binder are deposited on a transparent substrate (e.g. glass substrate) or a reflective type, i.e. the phosphor material and binder are deposited on a highly reflective substrate (e.g. polished aluminum). For the reflection type the reflection coefficient should be high (e.g. >95%) for both the incident excitation wavelength range and the spectrum of the light emitted by the excited phosphor layer.

Figure 19:
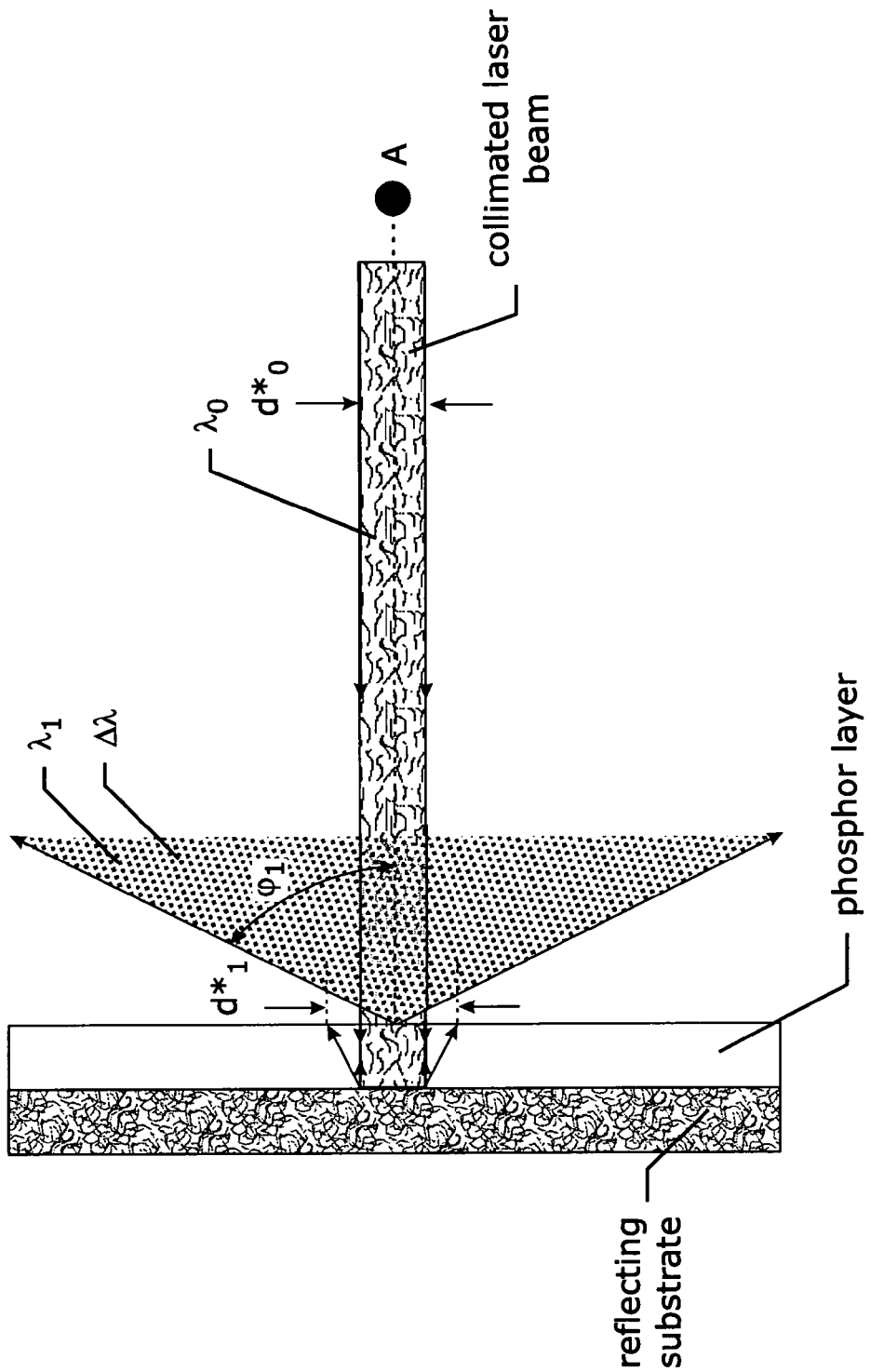
FIG. 19 shows a phosphor layer on a reflecting substrate illuminated by a collimated laser beam.

For the phosphor layer deposited on a reflecting substrate, the power of the incident laser beam at a wavelength $\lambda_0$ is causing photoluminescence in the phosphor layer, therefore the phosphor layer will emit converted light in a wavelength range $\Delta\lambda$ around a central wavelength $\lambda_1 > \lambda_0$ (for the case of the phosphor down-conversion) (see FIG. 19. FIG. 19 shows a phosphor layer on a reflecting substrate illuminated by a collimated laser beam). The laser light and the converted light are scattered by the phosphor material and the binder. The light emitting area of the phosphor layer will therefore be larger, diameter $d_1^*$, than the incident laser spot with diameter $d_0^*$. The difference between $d_1^*$ and $d_0^*$ depends on the thickness of the phosphor layer and the scattering properties of the phosphor and the binder. The light emitted from the phosphor layer has and angular spread that is approximated by a Lambertian radiator. The size of the light emitting area on the phosphor layer can be changed by changing the laser illumination pattern on the phosphor. A large illumination pattern will result in large spot and a large étendue, a smaller illumination pattern will result in a smaller étendue. In the assumption that almost all the light power is confined in a cone with half angle of 70°, then the étendue is $$\frac{d_1^{*2}\pi^2}{4}\cdot 0.883.$$

The larger spot has the advantage of a lower phosphor temperature for the excitation power, and consequently longer phosphor life time. The smaller spot at the equal excitation power will result in higher luminance as long as there is no thermal quenching of the phosphor layer.

The phosphor based diffuser element can be static or moving (e.g. rotating). For the moving type the distribution of the incident light of the laser beam is spread over a larger area and therefore a lower temperature of the excited phosphor layer is achieved. The location of the light spot on the diffuser element can be controlled by a control unit 8.

Figure 20:
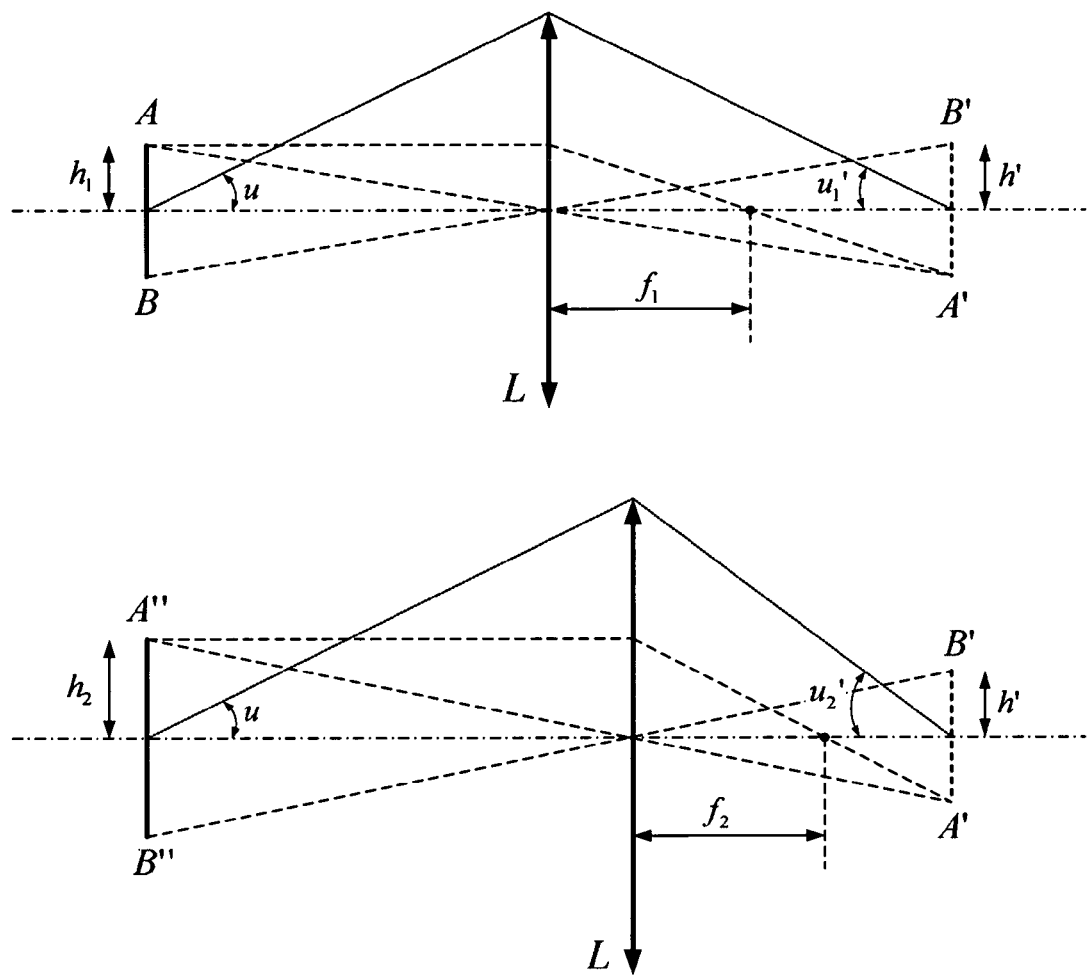
FIG. 20 shows an embodiment of the conversion of the of the varying laser illumination spot on the diffuser to a varying maximum illumination cone angle on the micro display.

A second illumination system with the following functions:

a) it captures the light from the light spot on the diffuser element and images it on a spatial light modulator, e.g. a light valve or a micro display such as a Micro-Mirror Device.

b) it converts the property of the varying light e.g. laser illumination spot size on the diffuser location to a varying maximum illumination cone angle on the spatial light modulator, e.g. a light valve or micro display, i.e. if the light or laser beam spot size on the diffuser is low, then the maximum illumination cone angle on the spatial light modulator, e.g. a light valve or micro display is also low, and if the light or laser beam spot size at the diffuser is high, the maximum illumination cone angle on the spatial light modulator, e.g. a light valve or micro-display is also high. An embodiment of this function is depicted in FIG. 20. |A B| and |A" B"| represent the diameter of the circular assumed light emitting spot on the diffuser exit surface, for two cases where |A B|<|A"B"|. L is the paraxial approximated equivalent of a lens system which is imaging A B and A" B" onto A' B'. The properties of this lens system are controlled with an output control signal from control unit (8). When the light emitting spot is increasing from |A B| to |A" B"| then the lens system L will change the position of it's lens elements, it's apertures and if necessary it's aperture diameters so that both (i) the image size |A' B'| is kept constant and (ii) the angular diameter 2u is kept constant. From the Langrange invariant $h_1 u = h' u'_1$ and $h_1 u = h' u'_2$ it follows that $$u'_2 = u'_1 \frac{h_2}{h_1}.$$

FIG. 20 shows an embodiment of the conversion of the of the varying laser illumination spot on the diffuser to a varying maximum illumination cone angle on the micro display.

c) it homogenizes the light, so that the illumination on the spatial light modulator, e.g. a light valve or micro display is almost equal for all areas, for light e.g. laser beam spot sizes.

A spatial light modulator, e.g. a light valve or micro display (5) of the reflective or the transmissive type, e.g. DMD or DLP, LCD high temperature poly silicon or LCoS.

An imaging system (6) that makes a real image of the spatial light modulator, e.g. a light valve or micro display on the screen (7). The screen can be a front projection screen or a rear projection screen or simply a wall. This imaging system could be a single projection lens, or a combination of projection lenses.

An adjustable and controllable aperture such as an iris (9) in the limiting aperture of the imaging system (6) that images the illuminated spatial light modulator, e.g. a light valve or micro display (5) on to the projection screen (7). This imaging system could be a single projection lens, or a combination of projection lenses. The controllable aperture of the iris is largely contributing to the main contrast improvement by blocking the stray light from the black state of the spatial light modulator such as a light valve or micro-display (like LCoS or DLP device). The adjustable and controllable aperture can be controlled by a control unit 8.

Aperture (11) and aperture (12) are optional controllable apertures, the diameter of the light transmitting part of these apertures is adjusted with a control signal from control unit (8) according to the scattering half cone angle of the diffuser. These apertures will block the light rays in unwanted directions cause by scattering in the diffuser element (3) or the second illumination system (4). One of the apertures (11) or

(12) can be an integral part of the second illumination system. The optional apertures 11 and 12 can be controlled by a control unit 8.

A control unit (8) which controls the first illumination system, the second illumination system, the iris (9), the optional apertures (11) and (12). The control unit can also control the optical power output of the light source, e.g. laser (1). The control unit has an input control signal (10).

The control signal can be generated directly from an image generator as is the case for simulators where a so called time-of-day signal is indicating the necessary black level and luminance level. The control signal can also be generated by a system that calculates the average picture level. In this case the necessary black level and luminance level are automatically adapted at the average picture level.

Note that the above has been described for one color channel operation. Any of the embodiments of the present invention can be used for 3 or more color channels. Any of the embodiments of the present invention a shared diffuser (combination and then re-splitting) can be used or a diffuser per color, and then split the light afterwards. A single channel with time multiplexing of the three colors is also included within the scope of any of the embodiments.

The controller as described above can include a processing engine such as a Central Processing Unit ("CPU"), e.g. a conventional microprocessor of which a Pentium processor supplied by Intel Corp. USA is only an example, or an FPGA for example and a number of other units interconnected via a bus system. The bus system may be any suitable bus system. The controller may be implemented as a microcontroller. The controller can include at least one memory. Memory may include any of a variety of data storage devices known to the skilled person such as random-access memory ("RAM"), read-only memory ("ROM"), and non-volatile read/write memory such as a hard disc as known to the skilled person. For example, the controller may further include random-access memory ("RAM"), read-only memory ("ROM"). Optionally the controller may include a display adapter for connecting to a video display terminal, and an optional input/output (I/O) adapter for connecting peripheral devices (e.g., disk and tape drives) to the system bus. The video display terminal can be the visual output of the controller, and can be any suitable display device such as a CRT-based video display well-known in the art of computer hardware or an LCD-based or a gas plasma-based flat panel display.

The controller can also include a graphical user interface that resides within machine-readable media. Any suitable machine-readable media may retain the graphical user interface, such as a random access memory (RAM), a read-only memory (ROM), a magnetic diskette, magnetic tape, or optical disk (the last three being located in disk and tape drives). Any suitable operating system and associated graphical user interface (e.g., Microsoft Windows, Linux) may direct CPU. In addition, the controller includes a control program that resides within computer memory storage. The control program contains instructions that when executed on CPU allow the controller to carry out the operations described with respect to any of the methods of the present invention.

Those skilled in the art will appreciate that other peripheral devices such as optical disk media, audio adapters, or chip programming devices, such as PAL or EPROM programming devices well-known in the art of computer hardware, and the like may be utilized in addition to or in place of the hardware already described.

The above controller is adapted for use with a projector optical system for projecting a picture having an average picture level according to any of the embodiments of the invention. The optical system can be for use with a light source having a substantially low intrinsic étendue. In embodiments of the present invention the controller is adapted to vary, according to an average picture level, an effective étendue of the light source and to keep light power confined within the varying cone angle, whereby at the imaging system the projector étendue is matched to the effective étendue of the light source, the effective light source étendue and the projector étendue being controlled by the control unit and being adapted to the average picture level.

The computer program product can comprise code segments for execution on a processing engine such as in a computer, the computer program product being adapted to operate a projector optical system for projecting a picture having an average picture level and for use with a light source having a substantially low intrinsic étendue. The optical system can comprise:

A first illumination system

A Diffuser element or other means for increasing the light source étendue.

A second illumination system that captures the light from the light spot on the means for increasing the light source étendue such as the diffuser element and homogenizes the light, so that the illumination on a spatial light modulator such as a light valve or micro-display is almost equal for all areas and images it on the spatial light modulator such as a light valve or micro-display An imaging system for making a real image of the spatial light modulator such as a light valve or micro-display on a screen A control unit, and A controllable apertures such as an iris controlled by the control unit in the limiting aperture of the imaging system, the controllable aperture being adapted to block stray light from the black state of the spatial light modulator such as a light valve or micro-display. The software is adapted to vary, according to an average picture level, an effective étendue of the light source and keeping light power confined within a varying cone angle, and matching at the imaging system the projector étendue to the effective étendue of the light source, the effective light source étendue and the projector étendue being adapted to the average picture level.

The variation is obtained by control of elements of the optical system as described in the first and second embodiments with respect to FIGS. 17 and 21.

The software may be adapted to control the means for increasing the light source étendue. The software can be adapted to control the location on the means for increasing the étendue on which the light beam is falling. The software can be adapted to control the controllable aperture in the imaging system and/or adapted to control at last one further aperture. The software can be adapted to control the optical system such that $\epsilon_{L\ eff}$ and $\epsilon_{P\ eff}$ are equal and for example can adapt these to the average picture level. The software can be adapted to control the optical system so that the effective étendue of the light source and the effective étendue of the projector are kept equal and are set at a value dependent on the average picture content $\epsilon_{Leff}(w)=\epsilon_{Peff}(w)=f(w)$ where $f(w)$ is defined for $w \in [0,1]$ and $f(1)=\epsilon_{P\ max}\epsilon_{Leff\ max}$ and $f(0)=\epsilon_{P\ min}=\epsilon_{Leff\ min}$. The software may be adapted to control the optical system so that the absolute maximum level of acceptable speckle contrast defines the minimum value $\epsilon_{P\ min}$ of $f(w)$.

The computer program product may be stored on a non-transient signal recording medium such as an optical disk like a DVD or CD-ROM, a magnetic disk such as a hard drive, a solid state memory, a magnetic tape, FLASH memory etc.

REFERENCES

[1] B. Maximus, "Aspects of high dynamic range on high resolution projection systems", Image 2011 Conference.
[2] Bahaa E. A. Saleh and Malvin Carl Teich, "Fundamentals of Photonics", pp. 128-131 John Wiley & Sons, Inc, 1991.
[3] Moench H. et. al., "UHP Lamps for Projection Systems", IDW 2000, pp. 1053-1056.
[4] Goodman J. W., "Speckle Phenomena in Optics", pp. 178-185, Roberts and Company Publishers, 2007.
[5] J. F. Goldenberg et al., "Rear Projection Screens for Light Valve Projection Systems", Proc. SPIE Projection Displays III, 1997.
[6] M. Born and E. Wolf, "Principles of Optics", Pergamon Press Sixth Edition 1983.
[7] M. S. Brennesholtz and E. H. Stupp, "Projection Displays", Second Edition 2008 John Wiley & Sons Ltd.
[8] P. F. Smet et. al., "Selecting Conversion Phosphors for White Light-Emitting Diodes", Journal of The Electrochemical Socienty, 158 (6) R37-R54 (2011).
[9] C. Ronda, "Luminescence", Wiley-VCH Verlag GmbH & Co. KGaA.
[10] S. Nakamura et. al., "The Blue Laser Diode", (2000), pp. 230-235.
[11] Chien-Hsiang Hung et. al., "Phosphor Modeling for Phosphor-converted LEDs", SID 2010 Digest, pp. 886-889.
[12] F. Romeo, "Casio Projectors with Hybrid LEDLaser-Phosphor Illumination, SID 2010 Digest, pp. 979-981.
[13] T. Miyazaki, "Light Source Device, projection apparatus, and projection method", US Patent Application Publication, US 20100328626 A1, Dec. 30, 2010.
[14] Akio Furukawa et. al., "RGB Laser Light Source Module with High Efficiency for Large Screen Projectors", IDW 2010, pp. 1777-1779.
[15] M. Oka et. al., "A New Compact Continuous-Wave Green Laser with Line Beam", Proc. SPIE, Vol. 6875, paper 20, 2008.
[16] J. W. Raring et. al., "Progress in Green and Blue Laser Diodes and Their Application in Pico Projection Systems", SID 2011 DIGEST, pp. 677-680.
[17] A. Avramescu et. al., "Recent Progress in Direct Green Lasers for Mobile Image Projectors", SID 2011 DIGEST, pp. 685-688.
[18] Y. Gan et. al., "1 Watt Compact Green Laser for Projection Display", SID 2011 DIGEST, pp. 689-690.
[19] B. D. Silverstein et. al., "A Laser-Based Digital Cinema Projector", SID 2011, DIGEST, pp. 326-329.
[20] E. G. Rawson et. al., "Speckle-free rear-projection screen using two close screens in slow relative motion", J. Opt. Soc. Am., Vol. 66, No. 11, November 1976, pp. 1290-1294.
[21] S. Lowenthal et. al., "Speckle Removal by a Slowly Moving Diffuser Associated with a Motionless Diffuser", J. Opt. Soc. Am., Vol. 61, No. 7, July 1971, pp. 847-851.
[22] S. Kubota et. al., "Very efficient speckle contrast reduction realized by moving diffuser device", Applied Optics, Vol. 49, No. 23, 10 Aug. 2010, pp. 4385-4391.
[23] J. W. Goodman, "Some fundamental properties of speckle", J. Opt. Soc. Am., Vol. 66, No. 11, November 1976, pp. 1145-1150.
[24] F. W. Campbell and R. W. Gubisch, "Optical Quality of the Human Eye", J. Physiol. (1966), 186, pp. 558-578.
[25] D. Parker, "The dynamic performance of CRT and LC displays" in "Display Systems" Edited by L. W. MacDonald and A. C. Lowe, John Wiley & Sons 1997, pp. 353-364.
[26] D. S. Dewald et. al., "Advances in Contrast Enhancement for DLP Projection", SID 2002 DIGEST, pp. 1246-1249.
[27] M. T. Davis et. al., "Dynamic aperture for a light processing system", U.S. Pat. No. 7,532,259 B2, May 12, 2009.
[28] D. S. Dewald et. al., "High contrast projection", U.S. Pat. No. 7,182,469 B2, Feb. 27, 2007.
[29] S. M. Penn et. al., "Adaptive Illumination Modulator", U.S. Pat. No. 6,875,751 B2, Feb. 2, 2007.
[30] P. G. J. Barten, "Contrast sensitivity of the human eye and its effect on image quality", PhD dissertation Technical University Eindhoven, 1999.
[31] P. G. J. Barten, "Evaluation of subjective image quality with the square-root integral Method", J. Opt. Soc. Am. A/Vol. 7, No. 10/October 1990.
[32] D. J. Segler et. al., "The Importance of Contrast for Rear Projection Television and its Effect on Image Quality", SMPTE, 36th Advanced Motion Image Conference.
[33] B. E. Rogowitz, "The human visual system: a guide for the display technologist",
[34] Y. Kusakabe et. al., "A YC-separation-type projector: High dynamic range with double modulation", Journal of the SID 162, 2008, pp. 383-387.
[35] S. F. Quinn and P. M. Newman, "The Distribution of Average Picture Levels in Television Programs—A Technical Note" Journal of the SMPTE September 1967 Volume 76 page 924.

The invention claimed is:

1. A projector optical system for projecting a picture having an average picture level and for use with a light source having a substantially low intrinsic étendue, comprising an imaging system for making a real image of a spatial light modulator on a screen, and a control unit,
  wherein the projector optical system is adapted to vary, according to an average picture level, an effective étendue of the light source and to keep light power confined within a varying cone angle, whereby at the imaging system the projector étendue is matched to the effective étendue of the light source, the effective light source étendue and the projector étendue being controlled by the control unit and being adapted to the average picture level.

2. The system of claim 1 further comprising:
  a first illumination system;
  a means for increasing the light source étendue;
  a second illumination system that captures the light from the light spot on the means for increasing the light source étendue and homogenizes the light, so that the illumination on the spatial light modulator is almost equal for all areas and images it on the spatial light modulator; and
  a controllable aperture controlled by the control unit in the limiting aperture of the imaging system, the controllable aperture being adapted to block stray light from the black state of the spatial light modulator.

3. The system of claim 1 wherein the light is a laser optionally with an étendue of 0.6 μm$^2$sr.

4. The system of claim 2, wherein the means for increasing the light source étendue is a diffuser element.

5. The system of claim 4, wherein the diffuser element is selected from a static, a moving, and a rotating type.

6. The system of claim 4, wherein the diffuser element is selected from a transmissive type and a reflective type.

7. The system of claim 4, wherein the diffuser element has a varying strength, with a different scattering half cone angle depending on the location of the light beam on the diffuser element.

8. The system of according to 5, wherein the diffuser element further comprises a diffusive layer attached or deposited on one of a transmissive substrate and a reflective substrate.

9. The system of claim 4, wherein the diffuser element has a scattering half cone angle $\phi_1$ and a light spot at the exit side of the diffuser element with a diameter $d_1$ and the étendue of the light emitted by the diffuser element is increased to a value $$\frac{d_1^2 \pi^2}{4} \sin^2 \varphi_1.$$

10. The system according to claim 2 wherein the first illumination system includes a beam expander, in order to lower the power density of the incident light on the means for increasing the light source etendue.

11. The system according to claim 2, wherein the first illumination system includes a beam shaper element, in order to create a top-hat illumination density function on the means for increasing the light source etendue.

12. The system according to claim 4, wherein the second illumination system maintains the property of a varying maximum scattering angle from the diffuser location also as a varying maximum illumination cone angle on the spatial light modulator so that if the maximum diffusive angle at the diffuser element is low, then the maximum illumination cone angle on the spatial light modulator is also low, and if the maximum diffusive angle at the diffuser element is high, the maximum illumination cone angle on the spatial light modulator is also high.

13. The system according to claim 4 wherein the second illumination system homogenizes the light so that the illumination on the spatial light modulator is almost or substantially equal for all areas, for all diffusive angles.

14. The system according to claim 2 further comprising at least one further aperture the diameter of the light transmitting part of this at least one further aperture being adjusted with a control signal from a control unit according to the scattering half cone angle of the means for increasing the light source étendue.

15. The system according to claim 2 wherein the control unit is adapted to control the location on the means for increasing the light source etendue on which the light beam is falling.

16. The system according to claim 1 wherein the control unit is adapted to receive an input control signal, whereby the input control signal can be generated directly from an image generator.

17. The system according to claim 1 wherein the control unit is adapted to control the system so that the absolute maximum level of acceptable speckle contrast defines the minimum value $\epsilon_{P\ min}$ of a function $f(w)$.

18. The system according to claim 16, wherein the control signal is a time-of-day signal indicating the black level and luminance level.

19. The system according to claim 16 wherein the control signal is generated by a unit that calculates the average picture level.

20. The system according to claim 4, wherein there are a plurality of colour channels and the diffuser element is a shared diffuser or a diffuser per color or there is a single color channel used with time multiplexing of the plurality of colors.

21. The system according to claim 1, wherein the system is adapted to have a means for increasing the etendue with a small scattering cone angle, and simultaneously a controllable aperture with a corresponding small opening such that the effective light source etendue $\epsilon_{Leff}$ and the projector etendue $\epsilon_{Peff}$ are equal.

22. The system according to claim 4 wherein the diffuser element is a diffuser which preserves the same wavelength as at the input.

23. The system according to claim 4 wherein for the diffuser element there is not only a diffusion of light inside of a certain maximum diffusive angle, but also a conversion of the wavelength of the incident light to an outgoing spectrum of longer wavelengths (down-conversion phosphor) or shorter wavelengths (up-conversion phosphor).

24. The system of claim 1, wherein the spatial light modulator comprises a light valve or a micro display.

* * * * *